US012598535B2

(12) United States Patent
 Paradkar et al.

(10) Patent No.:  US 12,598,535 B2
(45) Date of Patent:  Apr. 7, 2026

(54) TECHNIQUES FOR SUBSCRIPTION BASED OR NETWORK SLICE BASED TRAFFIC DIFFERENTIATION AND ROUTING

(71) Applicant: QUALCOMM Incorporated, San Diego, CA (US)

(72) Inventors: Vinay Paradkar, Broomfield, CO (US); Bhupesh Manoharlal Umatt, Poway, CA (US); Vikram Singh, San Diego, CA (US); Reza Shahidi, San Diego, CA (US); Sunmeet Gill, San Diego, CA (US); Can Zhao, San Diego, CA (US); Chao Zou, San Jose, CA (US)

(73) Assignee: QUALCOMM Incorporated, San Diego, CA (US)

( * ) Notice:  Subject to any disclaimer, the term of this patent is extended or adjusted under 35 U.S.C. 154(b) by 437 days.

(21) Appl. No.: 17/651,271

(22) Filed: Feb. 16, 2022

(65) Prior Publication Data

US 2022/0303869 A1    Sep. 22, 2022

Related U.S. Application Data

(60) Provisional application No. 63/164,373, filed on Mar. 22, 2021.

(51) Int. Cl.
 *H04W 40/24*      (2009.01)
 *H04L 45/00*      (2022.01)
 (Continued)

(52) U.S. Cl.
 CPC ........... *H04W 40/248* (2013.01); *H04L 45/34* (2013.01); *H04L 61/2514* (2013.01); *H04L 61/4511* (2022.05); *H04W 76/15* (2018.02)

(58) Field of Classification Search
 CPC .... H04W 40/248; H04W 76/15; H04L 45/34; H04L 61/2514; H04L 61/4511; H04L 61/2517; H04L 2101/677
 See application file for complete search history.

(56) References Cited

U.S. PATENT DOCUMENTS

| | | | | |
|---|---|---|---|---|
| 2013/0301610 | A1* | 11/2013 | Ali ........................ | H04W 40/36 370/331 |
| 2016/0094662 | A1* | 3/2016 | Kollu ................... | H04L 43/0882 709/224 |

(Continued)

FOREIGN PATENT DOCUMENTS

JP        2020053719 A       4/2020

OTHER PUBLICATIONS

"3rd Generation Partnership Project, Technical Specification Group Services and System Aspects, Study on System Enhancement for Proximity Based Services (ProSe) in the 5G System (5GS) (Release 17)", 3GPP Draft, 23752-110, 3rd Generation Partnership Project (3GPP), Mobile Competence Centre, 650, Route Des Lucioles, F-06921 Sophia-Antipolis Cedex, France, Mar. 15, 2021 (Mar. 15, 2021), XP051987232, Retrieved from the Internet: URL: https://ftp.3gpp.org/tsg_sa/WG2_Arch/Latest_SA2_Specs/Latest_draft_S2_Specs/23752-110.zip 23752-110_MCCclean.docx [Retrieved on Mar. 15, 2021] Abstract Sections 6.25.3, 6.28.1.1, 6.28.1.2.

(Continued)

*Primary Examiner* — Yaotang Wang
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may establish a first communication connection associated with a first subscription or associated with a first network slice, wherein the first communication connection is a default connection for the UE for data traffic. The UE
(Continued)

500 —➤ may establish a second communication connection associated with a second subscription or associated with a second network slice. The UE may receive, from a device via a wireless local area network provided by the UE or via a wired connection, a data traffic packet associated with one or more parameters. The UE may route the data traffic packet to the second communication connection based at least in part on the one or more parameters. The UE may transmit the data traffic packet using the second communication connection. Numerous other aspects are described.

30 Claims, 9 Drawing Sheets

(51) Int. Cl.

| | |
|---|---|
| *H04L 61/2514* | (2022.01) |
| *H04L 61/4511* | (2022.01) |
| *H04W 76/15* | (2018.01) |

(56) References Cited

U.S. PATENT DOCUMENTS

| | | | | |
|---|---|---|---|---|
| 2020/0221527 A1* | 7/2020 | Bharatia | ............... | H04W 76/22 |
| 2022/0104117 A1* | 3/2022 | Xu | ......................... | H04W 48/18 |
| 2023/0354463 A1* | 11/2023 | Talebi | ................... | H04W 76/27 |

OTHER PUBLICATIONS

Intel: "On Bearer Binding for Remote UEs and "EPS bearer proliferation"", 3GPP Draft, SA WG2 Meeting #110AH, S2-152840_PROSE_RELAY_BB, 3rd Generation Partnership Project (3GPP), Mobile Competence Centre, 650, Route Des Lucioles, F-06921 Sophia-Antipolis Cedex, France, vol. SA WG2, No. Sophia-Antipolis, France, Aug. 31, 2015-Sep. 3, 2015, Aug. 26, 2015 (Aug. 26, 2015), XP051034551, 5 Pages, Retrieved from the Internet: URL: http://www.3gpp.org/ftp/tsg_sa/WG2_Arch/TSGS2_110AH_Sophia/Docs/ [Retrieved on Aug. 26, 2015] The Whole Document.
Partial International Search Report—PCT/US2022/070703—ISA/EPO—May 11, 2022.
International Search Report and Written Opinion—PCT/US2022/070703—ISA/EPO—Jul. 4, 2022.
3GPP TR 23.752: "3rd Generation Partnership Project, Technical Specification Group Services and System Aspects, Study on System Enhancement for Proximity Based Services (ProSe) in the 5G System (5GS) (Release 17)", V1.1.0, 3rd Generation Partnership Project, Mobile Competence Centre, 650, Route Des Lucioles, F-06921 Sophia-Antipolis Cedex, France, Mar. 15, 2021, XP051987232, pp. 1-183.

* cited by examiner

300

310
Device

320
Traffic associated with the device

Tethering connection

120

330
Traffic associated with the device

Wireless network connection (cellular backhaul for the device)

110

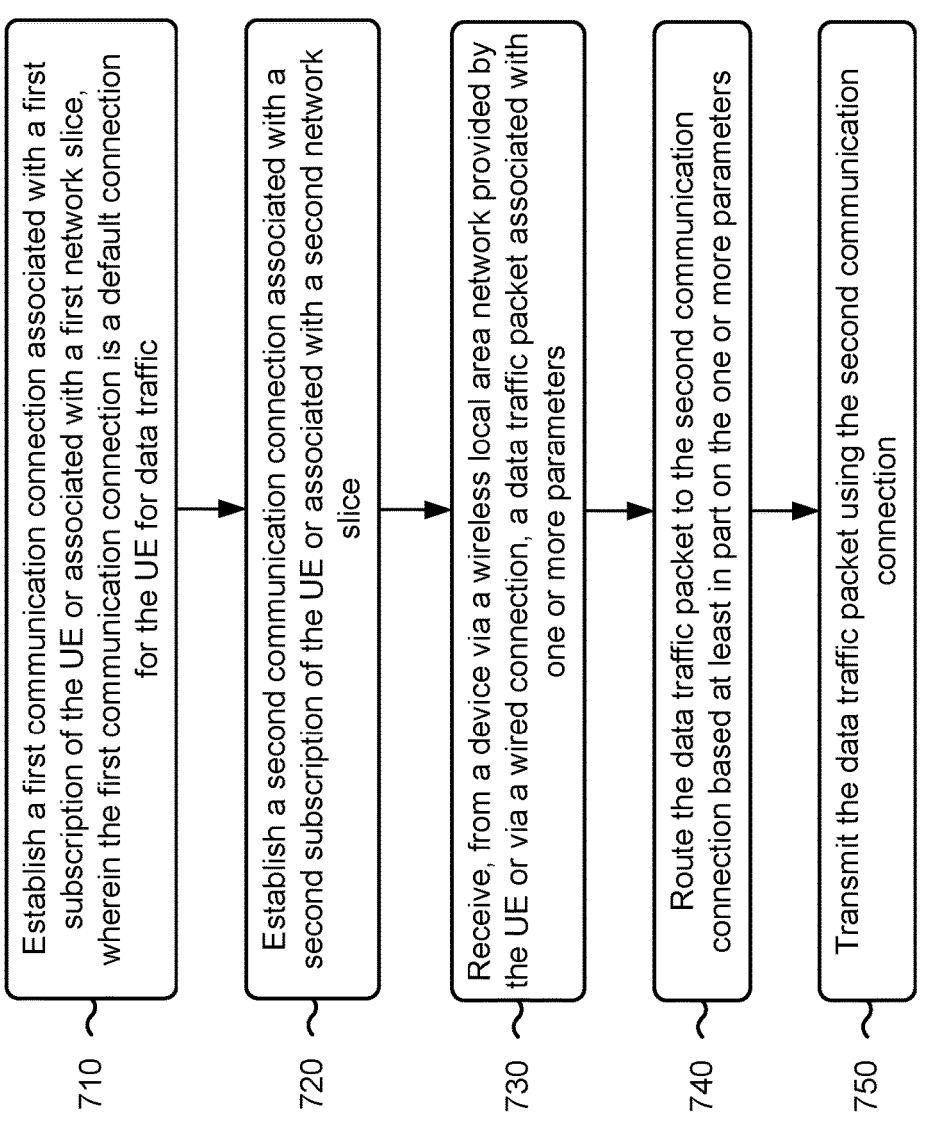

Establish a first communication connection associated with a first subscription of the UE or associated with a first network slice, wherein the first communication connection is a default connection for the UE for data traffic

710

Establish a second communication connection associated with a second subscription of the UE or associated with a second network slice

720

Receive, from a device via a wireless local area network provided by the UE or via a wired connection, a data traffic packet associated with one or more parameters

730

Route the data traffic packet to the second communication connection based at least in part on the one or more parameters

740

Transmit the data traffic packet using the second communication connection

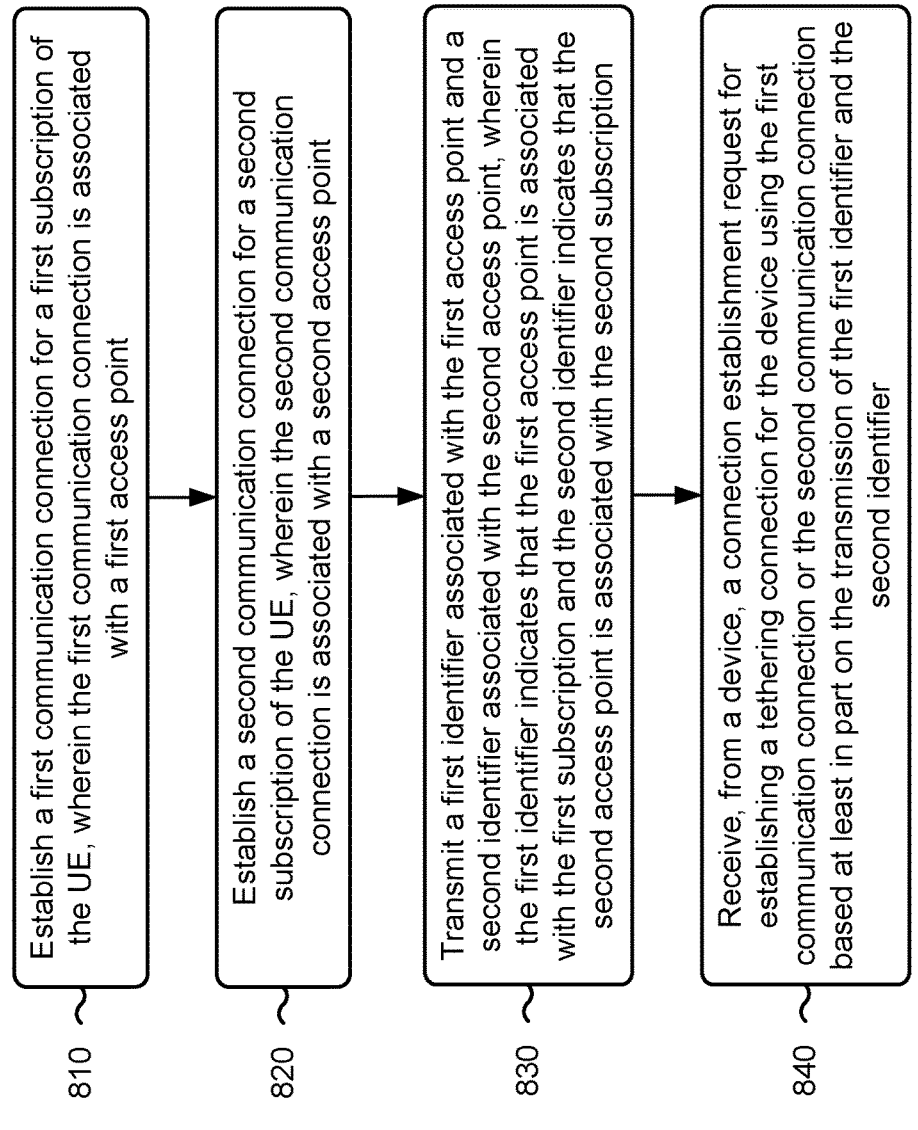

810   Establish a first communication connection for a first subscription of the UE, wherein the first communication connection is associated with a first access point 820   Establish a second communication connection for a second subscription of the UE, wherein the second communication connection is associated with a second access point 830   Transmit a first identifier associated with the first access point and a second identifier associated with the second access point, wherein the first identifier indicates that the first access point is associated with the first subscription and the second identifier indicates that the second access point is associated with the second subscription 840   Receive, from a device, a connection establishment request for establishing a tethering connection for the device using the first communication connection or the second communication connection based at least in part on the transmission of the first identifier and the second identifier

TECHNIQUES FOR SUBSCRIPTION BASED OR NETWORK SLICE BASED TRAFFIC DIFFERENTIATION AND ROUTING

CROSS-REFERENCE TO RELATED APPLICATION

This Patent Application claims priority to U.S. Provisional Patent Application No. 63/164,373, filed on Mar. 22, 2021, entitled "TECHNIQUES FOR SUBSCRIPTION BASED OR NETWORK SLICE BASED TRAFFIC DIF-FERENTIATION AND ROUTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for subscription based or network slice based traffic differentiation and routing.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. The downlink (or forward link) refers to the communication link from the base station to the UE, and the uplink (or reverse link) refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes establishing a first communication connection associated with a first subscription of the UE or associated with a first network slice, wherein the first communication connection is a default connection for the UE for data traffic; establishing a second communication connection associated with a second subscription of the UE or associated with a second network slice; receiving, from a device via a wireless local area network provided by the UE or via a wired connection, a data traffic packet associated with one or more parameters; routing the data traffic packet to the second communication connection based at least in part on the one or more parameters; and transmitting the data traffic packet using the second communication connection.

In some aspects, a method of wireless communication performed by a UE includes establishing a first communication connection for a first subscription of the UE, wherein the first communication connection is associated with a first access point; establishing a second communication connection for a second subscription of the UE, wherein the second communication connection is associated with a second access point; transmitting a first identifier associated with the first access point and a second identifier associated with the second access point, wherein the first identifier indicates that the first access point is associated with the first subscription and the second identifier indicates that the second access point is associated with the second subscription; and receiving, from a device, a connection establishment request for establishing a tethering connection for the device using the first communication connection or the second communication connection based at least in part on the transmission of the first identifier and the second identifier.

In some aspects, a UE for wireless communication includes a memory and one or more processors, coupled to the memory, configured to: establish a first communication connection associated with a first subscription of the UE or associated with a first network slice, wherein the first communication connection is a default connection for the UE for data traffic; establish a second communication connection associated with a second subscription of the UE or associated with a second network slice; receive, from a device via a wireless local area network provided by the UE or via a wired connection, a data traffic packet associated with one or more parameters; route the data traffic packet to the second communication connection based at least in part on the one or more parameters; and transmit the data traffic packet using the second communication connection.

In some aspects, a UE for wireless communication includes a memory and one or more processors, coupled to the memory, configured to: establish a first communication connection for a first subscription of the UE, wherein the first communication connection is associated with a first access point; establish a second communication connection for a second subscription of the UE, wherein the second communication connection is associated with a second access point; transmit a first identifier associated with the first access point and a second identifier associated with the second access point, wherein the first identifier indicates that the first access point is associated with the first subscription and the second identifier indicates that the second access point is associated with the second subscription; and receive, from a device, a connection establishment request for establishing a tethering connection for the device using the first communication connection or the second communication connection based at least in part on the transmission of the first identifier and the second identifier.

In some aspects, a non-transitory computer-readable medium storing a set of instructions for wireless communication includes one or more instructions that, when executed by one or more processors of a UE, cause the UE to: establish a first communication connection associated with a first subscription of the UE or associated with a first network slice, wherein the first communication connection is a default connection for the UE for data traffic; establish a second communication connection associated with a second subscription of the UE or associated with a second network slice; receive, from a device via a wireless local area network provided by the UE or via a wired connection, a data traffic packet associated with one or more parameters; route the data traffic packet to the second communication connection based at least in part on the one or more parameters; and transmit the data traffic packet using the second communication connection.

In some aspects, a non-transitory computer-readable medium storing a set of instructions for wireless communication includes one or more instructions that, when executed by one or more processors of a UE, cause the UE to: establish a first communication connection for a first subscription of the UE, wherein the first communication connection is associated with a first access point; establish a second communication connection for a second subscription of the UE, wherein the second communication connection is associated with a second access point; transmit a first identifier associated with the first access point and a second identifier associated with the second access point, wherein the first identifier indicates that the first access point is associated with the first subscription and the second identifier indicates that the second access point is associated with the second subscription; and receive, from a device, a connection establishment request for establishing a tethering connection for the device using the first communication connection or the second communication connection based at least in part on the transmission of the first identifier and the second identifier.

In some aspects, an apparatus for wireless communication includes means for establishing a first communication connection associated with a first subscription of the apparatus or associated with a first network slice, wherein the first communication connection is a default connection for the apparatus for data traffic; means for establishing a second communication connection associated with a second subscription of the apparatus or associated with a second network slice; means for receiving, from a device via a wireless local area network provided by the apparatus or via a wired connection, a data traffic packet associated with one or more parameters; means for routing the data traffic packet to the second communication connection based at least in part on the one or more parameters; and means for transmitting the data traffic packet using the second communication connection.

In some aspects, an apparatus for wireless communication includes means for establishing a first communication connection for a first subscription of the apparatus, wherein the first communication connection is associated with a first access point; means for establishing a second communication connection for a second subscription of the apparatus, wherein the second communication connection is associated with a second access point; means for transmitting a first identifier associated with the first access point and a second identifier associated with the second access point, wherein the first identifier indicates that the first access point is associated with the first subscription and the second identifier indicates that the second access point is associated with the second subscription; and means for receiving, from a device, a connection establishment request for establishing a tethering connection for the device using the first communication connection or the second communication connection based at least in part on the transmission of the first identifier and the second identifier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes associated with subscription based or network slice based traffic differentiation and routing, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
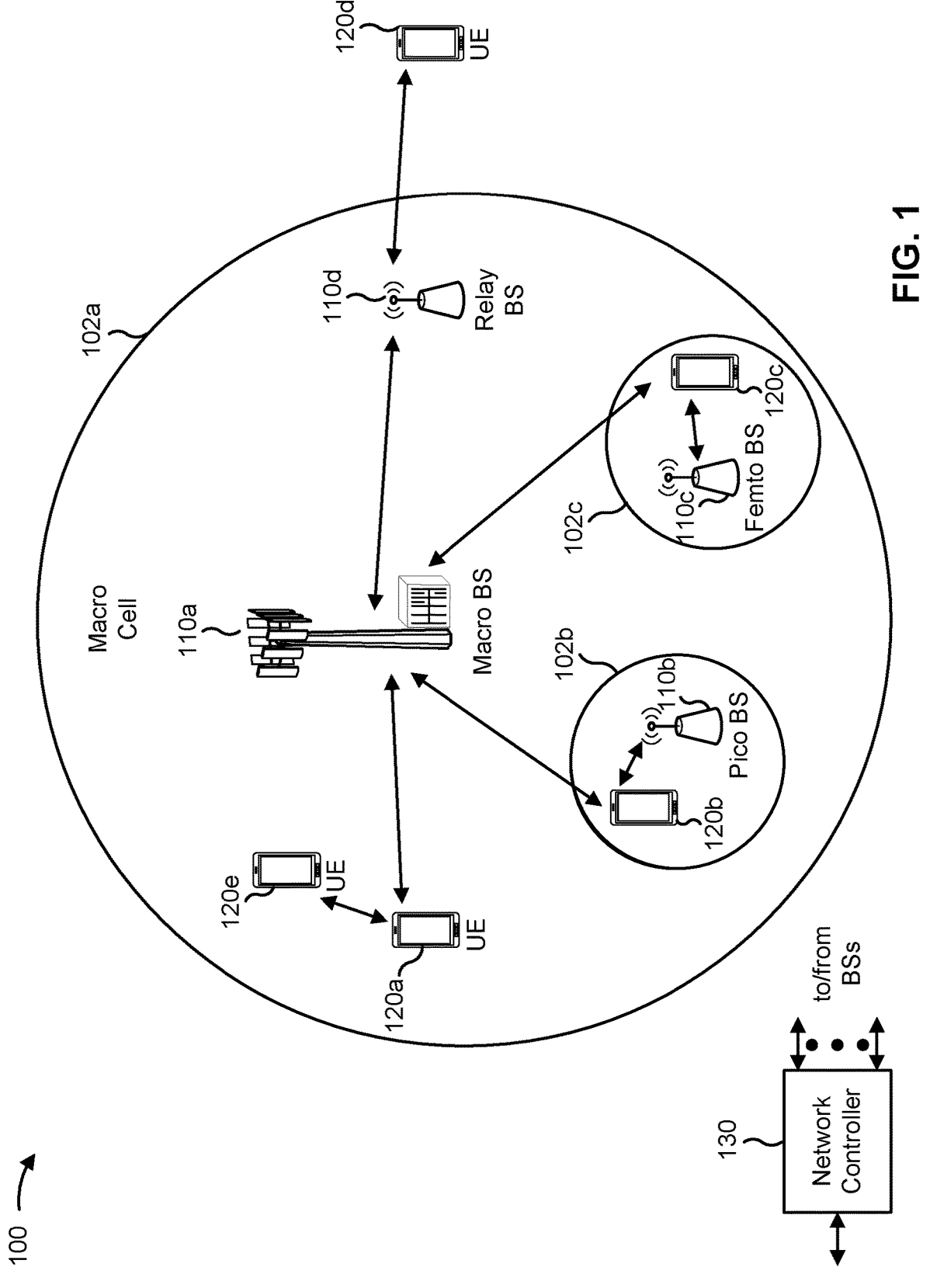
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110*a* may be a macro base station for a macro cell 102*a*, a base station 110*b* may be a pico base station for a pico cell 102*b*, and a base station 110*c* may be a femto base station for a femto cell 102*c*. A base station may support one or multiple (e.g., three) cells. The terms "eNB", "base station", "NR base station", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE)

and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
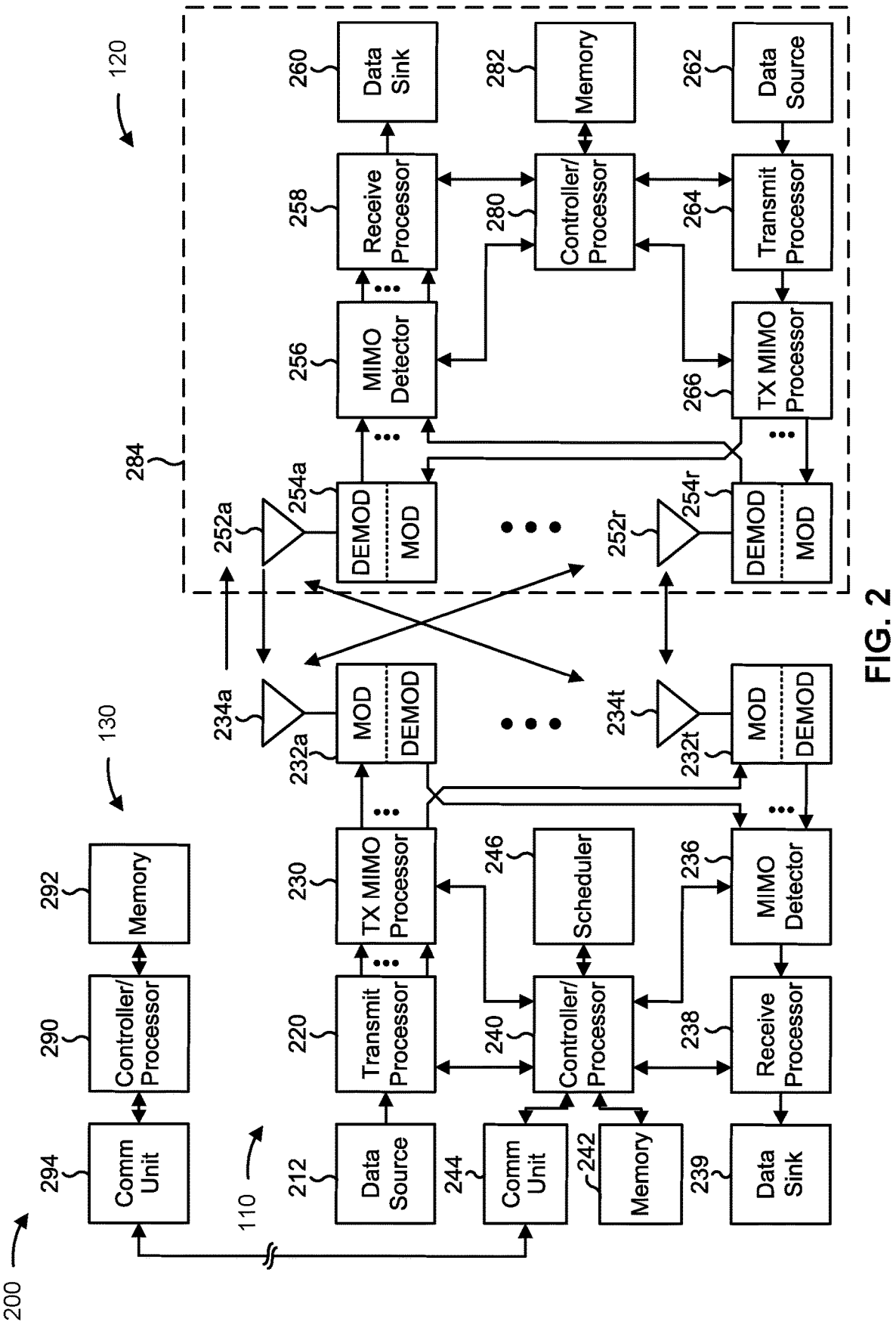
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-9).

Controller/processor 240 of base station 110, controller/processor 280 of UE 120, and/or any other component(s) of FIG. 2 may perform one or more techniques associated with subscription based or network slice based traffic differentiation and routing, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG.

8, and/or other processes as described herein. In some aspects, executing instructions may include running the instructions, converting the instructions, compiling the instructions, and/or interpreting the instructions.

In some aspects, the UE 120 includes means for establishing a first communication connection associated with a first subscription of the UE or associated with a first network slice, wherein the first communication connection is a default connection for the UE for data traffic; means for establishing a second communication connection associated with a second subscription of the UE or associated with a second network slice; means for receiving, from a device via a wireless local area network provided by the UE or via a wired connection, a data traffic packet associated with one or more parameters; means for routing the data traffic packet to the second communication connection based at least in part on the one or more parameters; and/or means for transmitting the data traffic packet using the second communication connection. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for establishing a first communication connection for a first subscription of the UE, wherein the first communication connection is associated with a first access point; means for establishing a second communication connection for a second subscription of the UE, wherein the second communication connection is associated with a second access point; means for transmitting a first identifier associated with the first access point and a second identifier associated with the second access point, wherein the first identifier indicates that the first access point is associated with the first subscription and the second identifier indicates that the second access point is associated with the second subscription; and/or means for receiving, from a device, a connection establishment request for establishing a tethering connection for the device using the first communication connection or the second communication connection based at least in part on the transmission of the first identifier and the second identifier. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
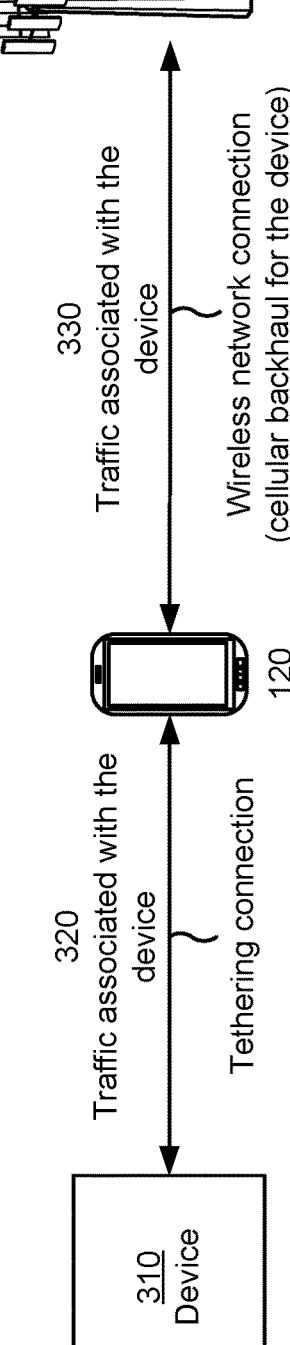
FIG. 3 is a diagram illustrating an example of a UE providing a wireless connection for a device, in accordance with the present disclosure.

FIG. 3 is a diagram illustrating an example 300 of a UE providing a wireless connection for a device, in accordance with the present disclosure. As shown in FIG. 3, a base station 110, a UE 120, and a device 310 may communicate with one another. The UE 120 may provide a wireless (e.g., cellular) connection for the device 310 to enable the device 310 to access the wireless network associated with the base station 110. For example, the device 310 may establish a connection with the UE 120 (shown as a tethering connection). "Tethering connection", "tethered connection," or "tether connection" may refer to a connection between a device and UE 120 where the UE 120 is serving as a routing device for the device to route traffic to a wireless (e.g., cellular) network of the UE 120. The UE 120 may establish a connection with the base station 110 (shown as a wireless network connection). As used herein, "wireless network connection," "cellular network connection," or "communication connection" may refer to a connection between the UE 120 and the base station 110 over which the UE 120 communicates or routes traffic associated with a tethered device (e.g., the device 310). For example, in a tethering scenario, the wireless network connection may be used by the UE 120 to provide internet access to the device 310 (e.g., using the connection to the wireless network associated with the base station 110 between the UE 120 and the base station 110). For example, the wireless network connection may serve as a backhaul connection (e.g., cellular backhaul connection) for the device 310.

In some cases, the device 310 may be a device that is capable of connecting to the internet, but may not have a cellular connection capability (e.g., with the base station 110). For example, the device 310 may be a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

For example, the UE 120 may share or provide internet access (e.g., internet access provided by the wireless connection with the base station 110) to the device 310. As used herein, "tethering" may refer to the UE 120 providing or sharing a wireless data connection (e.g., a data connection provided by the wireless connection with the base station 110) to another device, such as the device 310. Tethering may also be referred to as providing a mobile hotspot, as providing a personal hotspot, as providing a portable hotspot, as providing a Wi-Fi hotspot, and/or as a phone as a modem (PAM) technique, among other examples. The device 310 may be referred to as a "tethered device." In a tethering scenario, the UE 120 may serve as a routing device between the device 310 and the base station 110.

In some cases, the tethering connection may be a wireless connection. For example, the UE 120 may broadcast an identifier of a wireless local area network (WLAN), such as a Wi-Fi network, provided by an access point of the UE 120. The device 310 may connect to the access point using a WLAN connection (e.g., a Wi-Fi connection). In some cases, the tethering connection may be another wireless connection, such as a Bluetooth connection. In some cases, the tethering connection may be a physical connection, such as a wired connection between the UE 120 and the device 310 (e.g., using a universal serial bus (USB) cable).

The tethering connection and the wireless network connection may enable traffic to be communicated from the device 310 to the UE 120 (e.g., via the tethering connection) and from the UE 120 to the base station 110 using the wireless (e.g., cellular) connection between the UE 120 and the base station 110 (e.g., the wireless network connection). For example, in the uplink, as shown by reference number 320, the device 310 may transmit traffic (e.g., data) to the UE 120 using the tethering connection. The UE 120 may receive the traffic and may route the traffic to an interface of the UE 120 associated with the wireless network connection with the base station 110. As shown by reference number 330, the UE 120 may transmit the traffic (e.g., that was received from the device 310) to the base station 110 using the wireless network connection.

Similarly, in the downlink, as shown by reference number 330, the base station 110 may transmit traffic for the device 310 to the UE 120 (e.g., via the wireless network connection). The UE 120 may route the traffic to an interface (and/or an access point) of the UE 120 associated with the tethering connection. As shown by reference number 320, the UE 120 may transmit the traffic (e.g., that was received from the base station 110) to the device 310 using the tethering connection. The routing of traffic for a tethered device (e.g., for the device 310) may be performed by the UE 120 using one or more protocol stacks of the UE 120 (e.g., an internet protocol (IP) layer, and/or a transport layer). Additionally, or alternatively, hardware components of the UE 120 may be configured to perform the routing of traffic for a tethered device (e.g., by an internet packet accelerator (IPA) of the UE 120).

As a result, the device 310 may access a data connection with the wireless network (e.g., associated with the base station 110) via the UE 120. Therefore, internet access for the device 310 is improved as the device 310 is enabled to access a data connection with the wireless network in environments in which the device 310 may otherwise be unable to establish an internet connection (e.g., in a vehicle, a train, in a public area, and/or outside of a home or office).

As indicated above, FIG. 3 is provided as an example. Other examples may differ from what is described with respect to FIG. 3.

Figure 4:
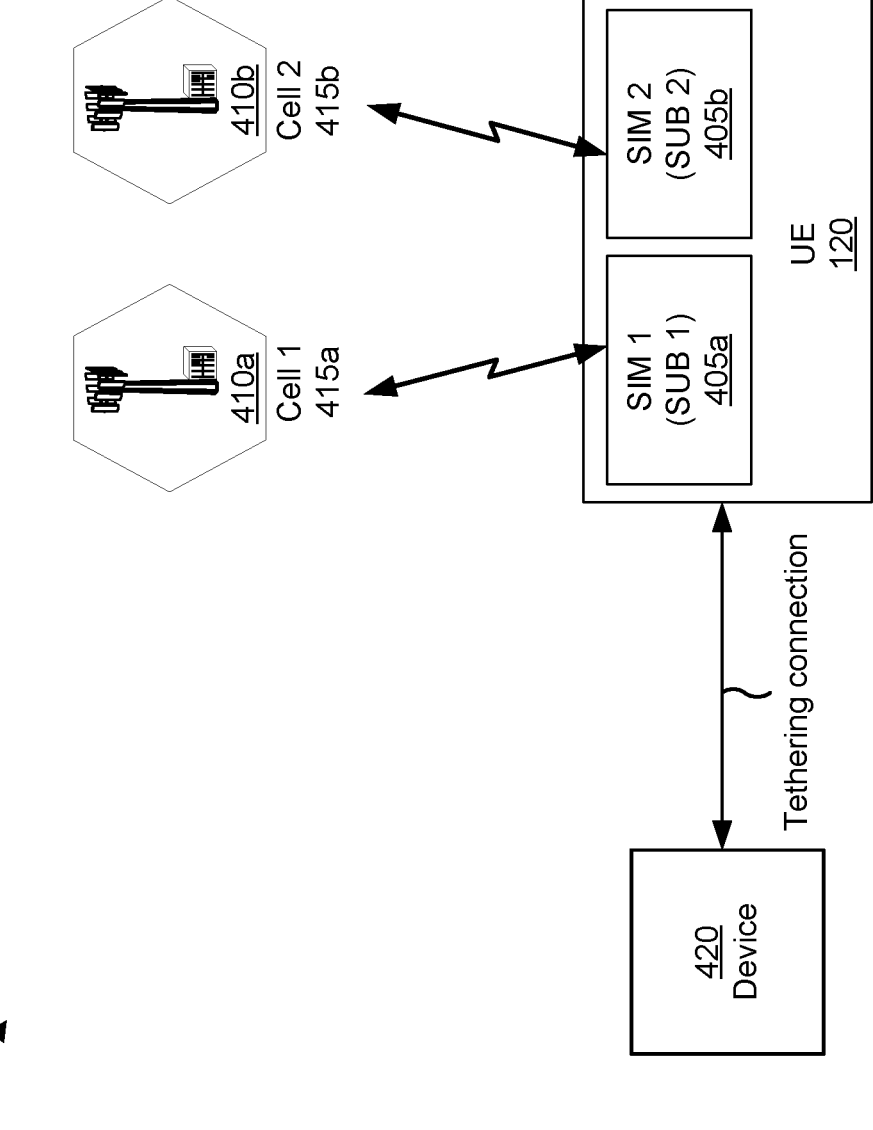
FIG. 4 is a diagram illustrating an example of a multiple subscriber identity module (multi-SIM) UE, in accordance with the present disclosure.

FIG. 4 is a diagram illustrating an example 400 of a multiple subscriber identity module (SIM) UE, in accordance with the present disclosure. As shown in FIG. 4, a UE 120 may be a multiple SIM (multi-SIM) UE that includes multiple SIMs (two or more SIMs), shown as a first SIM 405a and a second SIM 405b. The first SIM 405a may be associated with a first subscription (shown as SUB 1), and the second SIM 405b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator. As used herein, "SIM" and "subscription" may be used interchangeably.

A SIM 405 (e.g., the first SIM 405a and/or the second SIM 405b) may be a removable SIM (for example, a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples.

As further shown in FIG. 4, the UE 120 may communicate (for example, in a connected mode, an idle mode, or an inactive mode) with a first base station 410a via a first cell 415a (shown as Cell 1) using the first SIM 405a. In this case, a first subscription (SUB 1) of the UE 120 may be used to access the first cell 415a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 410b via a second cell 415b (shown as Cell 2) using the second SIM 405b. In this case, a second subscription (SUB 2) of the UE 120 may be used to access the second cell 415b (for example, using a second IMSI for UE identification, using a second security key for UE authentication, using a second list of services that the UE 120 is permitted to access using the second subscription, or by counting data or voice usage on the second cell against the second subscription, among other examples).

The first base station 410a and/or the second base station 410b may include one or more of the base stations 110 described above in connection with FIG. 1. Although the first cell 415a and the second cell 415b are shown as being provided by different base stations, in some aspects, the first cell 415 and the second cell 415b may be provided by the same base station. Thus, in some aspects, the first base station 410a and the second base station 410b may be integrated into a single base station.

In some cases, one of the first SIM 405a (e.g., the first subscription) or the second SIM 405b (e.g., the second subscription) may be a default or dedicated data subscription for the UE 120. The UE 120 may use the default or dedicated data subscription for sending and/or receiving data (e.g., internet traffic). For example, if the first SIM 405a (e.g., the first subscription) is the default or dedicated data subscription for the UE 120, then the UE 120 may use the connection with the first base station 410a as a default connection for data traffic (e.g., internet traffic) communicated by the UE 120.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a single receiver multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 405a (and the first subscription) at the same time as communicating using the second SIM 405b (and the second subscription). For example, when the UE 120 is in an active session (e.g., a voice call or another latency sensitive service, such as online gaming, stock trading, or an over-the-top (OTT) service) using the first SIM 405a, the UE 120 is capable of receiving a notification of a voice call using the second SIM 405b without interrupting communications that use the first SIM 405a, and without tuning or switching away from the first cell 415a to tune to the second cell 415b.

In a DSDS mode, the UE 120 is not capable of concurrent active communication using both SIMS of the UE 120. Thus, a UE 120 in the DSDS mode is not capable of communicating using the first SIM 405a (and the first subscription) at the same time as communicating using the second SIM 405b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 415*a* (as well as the first SIM 405*a* and the first subscription) uses an NR RAT and the second cell 415*b* (as well as the second SIM 405*b* and the second subscription) also uses the NR RAT. However, the UE 120 may not be capable of operating in a DSDA mode for NR+LTE, where one of the first cell 415*a* (as well as the first SIM 405*a* and the first subscription) uses an NR RAT and the second cell 415*b* (as well as the second SIM 405*b* and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

As shown in FIG. 4, the UE 120 may provide access to a wireless (e.g., cellular) network connection for a device 420 (e.g., in a similar manner as described above in connection with FIG. 3). For example, the UE 120 and the device 420 may establish a tethering connection to enable the UE 120 to provide the wireless (e.g., cellular) network connection for the device 420. In some cases, when the UE 120 provides a tethering connection for another device (e.g., the device 420), the wireless (e.g., cellular) network connection for the device 420 may be associated with (or fixed to) the default or dedicated data subscription for the UE 120.

For example, the device 420 may be required to access the wireless (e.g., cellular) connection of the UE 120 via the connection associated with the default or dedicated data subscription for the UE 120. For example, if the first SIM 405*a* (e.g., the first subscription) is the default or dedicated data subscription for the UE 120, then the UE 120 may always route traffic associated with the device 420 to the cellular connection associated with the first SIM 405*a* (e.g., the connection with the first base station 410*a*). However, in some cases, traffic associated with the device 420 may be better served by a cellular connection other than the cellular connection associated with the default or dedicated data subscription for the UE 120. For example, in some cases, the device 420 may access an application or service that receives an incentive (e.g., a billing incentive, a data rate incentive, and/or a charging incentive) from a network operator associated with the second SIM 405*b* (e.g., where the first SIM 405*a* is the default or dedicated data subscription for the UE 120). However, the UE 120 may only use the connection associated with the first SIM 405*a* for routing traffic associated with the device 420. Therefore, the device 420 may not receive the benefit provided by the incentive from the network operator associated with the second SIM 405*b* (e.g., even when the UE 120 is operating in a DSDA mode where a connection associated with the second SIM 405*b* is available to be used by the UE 120).

As another example, traffic associated with the device 420 may be associated with a high throughput level or a high data rate. In some cases, a network connection (e.g., a cellular connection or a communication connection) associated with the first SIM 405*a* may provide a lower data rate than a network connection (e.g., a cellular connection or a communication connection) associated with the second SIM 405*b*. For example, the network connection associated with the first SIM 405*a* may be associated with a first RAT, such as a 3G RAT or a 4G RAT. The network connection associated with the second SIM 405*b* may be associated with a second RAT that has a higher data rate or data capacity than the first RAT, such as a 5G RAT and/or a millimeter wave RAT. However, the UE 120 may only use the connection associated with the first SIM 405*a* for routing traffic associated with the device 420. Therefore, the high throughput level or a high data rate traffic of the device 420 may be routed using a lower data rate or lower data capacity RAT. As a result, a communication performance and communication efficiency of the traffic may be reduced.

Moreover, the UE 120 may route traffic for a tethered device (e.g., the device 420) to a default network slice of an active or selected SIM. For example, when the UE 120 is operating using a single SIM (e.g., in a DSDS mode or in a single SIM mode), the UE 120 may route traffic for a tethered device to a default network slice of the single SIM. Network slicing involves implementing logical networks on top of a shared physical infrastructure, where each network slice may include an end-to-end connection of functions deployed for a particular application, application type, traffic type, use case, among other examples. Each network slice may be identified by a network slice identity. A network slice identity may include a slice identifier referred to as a single network slice selection assistance information (S-NSSAI). The UE 120 may only route traffic for a tethered device to a default network slice (e.g., using a packet data unit (PDU) session associated with the default network slice). However, in some cases, traffic associated with the tethered device may be better served by a network slice other than the default network slice. For example, traffic associated with the tethered device may be associated with a low latency requirement. However, the default network slice may be associated with a higher latency than another network slice. As a result, the traffic associated with the tethered device may experience higher latency or degraded communication performance.

Some techniques and apparatuses described herein enable subscription based and/or network slice based traffic differentiation and routing for traffic associated with a tethered device. For example, the UE 120 may receive traffic from a tethered device over a tethering connection. The UE 120 may filter the traffic to determine whether the traffic satisfies or matches one or more rules. The one or more rules may be configured at the UE 120 (e.g., in an original equipment manufacturer (OEM) configuration). The one or more rules may be used by the UE 120 to identify traffic from a tethered device that should be routed to a non-default data connection (e.g., a non-default data subscription) or a non-default network slice of the UE 120. For example, if the traffic (e.g., if one or more parameters associated with the traffic) satisfies or matches a rule (e.g., of the one or more rules), then the UE 120 may route the traffic to a non-default data connection (e.g., a non-default data subscription) or a non-default network slice of the UE 120.

As a result, the UE 120 may be enabled to route traffic associated with a tethered device to a subscription or a network slice that best serves the traffic associated with the tethered device. For example, the UE 120 may be enabled to use a data connection or a network slice other than the default data connection or the default network slice for traffic associated with a tethered device. By enabling the UE 120 to filter the traffic associated with a tethered device to a data connection or a network slice other than the default data connection or the default network slice, communication performance of the traffic may be improved. For example, a tethered device may be enabled to realize benefits of incentives associated with using a subscription that is not the default data subscription of the UE 120. Additionally, or alternatively, the tethered device may experience improved data rates or reduced latency by using a data connection or a network slice, other than the default data connection or the default network slice, that better serves the traffic associated with the tethered device.

As indicated above, FIG. 4 is provided as an example. Other examples may differ from what is described with regard to FIG. 4.

Figure 5:
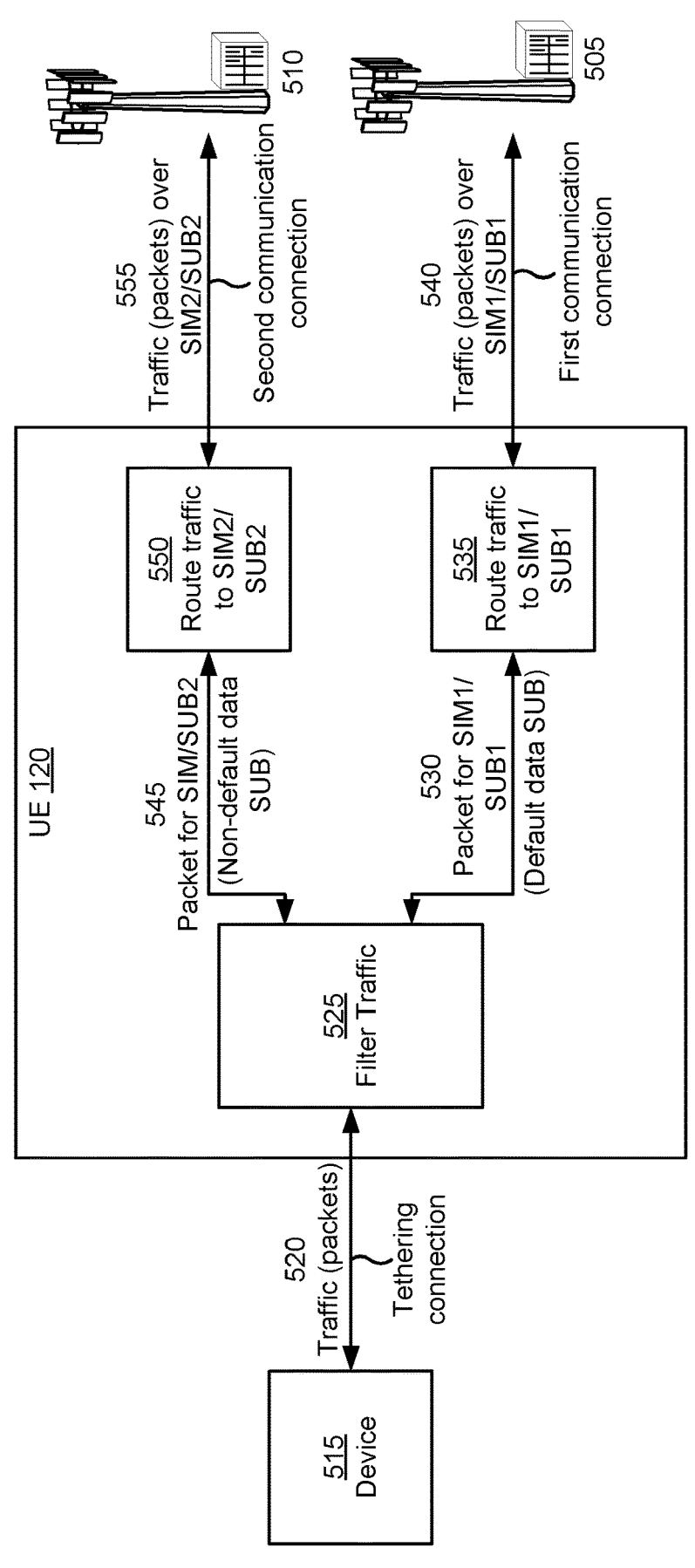
FIG. 5 is a diagram illustrating an example associated with subscription based or network slice based traffic differentiation and routing, in accordance with the present disclosure.

FIG. 5 is a diagram illustrating an example 500 of subscription based or network slice based traffic differentiation and routing, in accordance with the present disclosure. As shown in FIG. 5, a UE 120 may communicate with a first base station 505 and a second base station 510. For example, the UE 120 may be a multi-SIM UE (e.g., in a similar manner as described above in connection with FIG. 4). The first base station 505 may be associated with a first SIM (and/or a first subscription) of the UE 120. For example, the first base station 505 may provide a cell for a wireless network associated with a first network operator. The first network operator may be associated with the first SIM (and/or the first subscription) of the UE 120. Similarly, the second base station 510 may be associated with a second SIM (and/or a second subscription) of the UE 120. For example, the second base station 510 may provide a cell for a wireless network associated with a second network operator. The second network operator may be associated with the second SIM (and/or the second subscription) of the UE 120. While FIG. 5 depicts the UE 120 as a multi-SIM UE, in some aspects the UE 120 may be a single SIM UE (e.g., and the techniques or operations described herein may be used by the UE 120 to route traffic associated with a tethered device to a network slice that is not a default network slice for data traffic, as described in more detail below). The first base station 505 and/or the second base station 510 may be a base station 110 and/or a network entity, such as a CU, a DU, and/or an RU, among other examples.

As shown in FIG. 5, the UE 120 may provide a tethering service and/or a hotspot service. For example, the UE 120 may communicate with a device 515. The UE 120 may provide a wireless (e.g., cellular) network connection for the device 515 to enable the device 515 to access a wireless network associated with the UE 120 (e.g., in a similar manner as described above in connection with FIGS. 3 and 4). For example, the UE 120 may route traffic associated with the device 515 to and/or from a wireless network (e.g., associated with the first base station 505 or the second base station 510).

For example, the UE 120 may establish a first communication connection with the first base station 505. The first communication connection may be associated with the first subscription and/or the first SIM of the UE 120. Additionally, or alternatively, the first communication connection may be associated with a first network slice. The UE 120 may establish a second communication connection with the second base station 510. The second communication connection may be associated with the second subscription and/or the second SIM of the UE 120. Additionally, or alternatively, the second communication connection may be associated with a second network slice.

The first communication connection may be a default connection for the UE 120 for data traffic. "Default connection," "default data subscription," and/or "default network slice" may refer to a connection or an interface of the UE 120 that is configured or set to be associated with data traffic (e.g., internet traffic) communicated by the UE 120. A connection or interface that is not a default connection may be used to communicate other traffic (e.g., other than data traffic or internet traffic), such as voice calls, among other examples. The default connection may also be referred to as a default data subscription (DDS), a dedicated data subscription, a default data connection, and/or a default network slice, among other examples. The default connection may be indicated to the UE 120 (e.g., via a user input, for example) and/or may be dynamically determined by the UE 120. In a DSDS mode, the default connection may be associated with an active SIM among the first SIM and the second SIM. In a DSDA mode, the UE 120 may be capable of maintaining active sessions on both the default connection (e.g., on a DDS) and other network connections (e.g., associated with a non-DDS of the UE 120). "Non-DDS" or "not a DDS" may refer to a subscription of the UE 120 that is not a default subscription for the UE 120 to use to communicate data traffic (e.g., internet traffic).

In some aspects, the first communication connection (e.g., associated with the first subscription and/or the first network slice) may be the default connection for the UE 120 for data traffic, as described above. The second communication connection (e.g., associated with the second subscription and/or the second network slice) may not be a default connection for the UE 120 for data traffic (e.g., may be a non-DDS connection).

As described above, the first communication connection and the second communication connection may serve as wireless (e.g., cellular) connections associated with a tethering service and/or a hotspot service provided by the UE 120. For example, in some aspects, the UE 120 may be capable of communicating traffic using both the first communication connection and the second communication connection (e.g., in a DSDA mode). In some aspects, the UE 120 may be capable of communicating traffic using only one of the first communication connection or the second communication connection (e.g., in a DSDS mode).

As shown in FIG. 5, the UE 120 and the device 515 may establish a connection (e.g., a tethering connection) associated with the UE 120 providing a wireless connection (e.g., a connection to a wireless network) for the device 515. In some aspects, the tethering connection may be a wireless connection (e.g., a WLAN connection, a Wi-Fi connection, and/or a Bluetooth connection) or a wired connection. For example, the UE 120 may be associated with one or more access points (e.g., WLAN access points or Wi-Fi access points). The UE 120 may broadcast (e.g., advertise) information of the one or more access points (e.g., network identification information, such as a service set identifier (SSID) associated with a network provided by an access point). The device 515 may transmit a request to establish a connection with an access point of the UE 120. The UE 120 and the device 515 may establish the tethering connection using the access point.

In some aspects, the UE 120 may include a single access point associated with both the first subscription (and first SIM) and the second subscription (and the second SIM). In some aspects, the UE 120 may include separate access points (e.g., multiple separate access points) that are bridged to a single cellular network interface (e.g., and that are both associated with the first subscription and the second subscription). In some aspects, the UE 120 may include separate access points (e.g., multiple separate access points) that are associated with separate cellular connections. For example, the UE 120 may include a first access point associated with the first communication connection (e.g., and the first subscription/SIM) and a second access point associated with the second communication connection (e.g., and the second subscription/SIM).

As shown by reference number 520, the UE 120 may receive, from the device 515, traffic (e.g., a data traffic packet) that is to be routed by the UE 120 to a wireless network that the UE 120 is connected to (e.g., to the first base station 505 or the second base station 510). For example, the device 515 may transmit, and the UE 120 may receive, a packet using the tethering connection between the UE 120 and the device 515.

As shown by reference number 525, the UE 120 may filter the traffic (e.g., the packets) received from the device 515 to identify packets to be routed to a wireless network connection that is not the default network connection (e.g., packets that are to be routed to the second communication connection). For example, the UE 120 may determine whether one or more parameters of a packet satisfy a rule. The rule may be indicated by a configuration of the UE 120. For example, the UE 120 may be configured with one or more rules (e.g., in an OEM configuration). The one or more rules may be used to identify traffic associated with (e.g., received from or to be transmitted to) a tethered device that is to be routed (e.g., by the UE 120) to a subscription that is not the DDS or that is not associated with a default network connection. For example, the one or more rules may identify parameters of a packet that indicate that the packet is to be routed (e.g., by the UE 120) to a subscription (e.g., and not simply routed to the DDS without regard for the type of traffic or the parameters of the traffic).

The one or more rules may be associated with an identifier of a subscription (e.g., a mobile country code (MCC) and/or a mobile network code (MNC)). For example, the one or more rules may indicate that if a packet satisfies or matches a rule, that the packet is to be routed to the subscription identified by the MCC and/or the MNC associated with the rule. The one or more rules may indicate a service destination address, a service fully qualified domain name (FQDN), a port number for a service associated with traffic, and/or a type of service (TOS) value indicated by a packet, among other examples. As a result, the UE 120 is enabled to identify traffic associated with the device 515 that may be better served by a subscription (e.g., associated with a rule) rather than routing the traffic associated with the device 515 to the default network connection (e.g., regardless of the type of traffic or the service or application associated with the traffic). For example, the one or more rules may be used to identify traffic that is associated with incentives provided by a subscription (e.g., provided by a network operator associated with the subscription) associated with the one or more rules.

In some aspects, the one or more rules may indicate a throughput threshold or a data rate threshold. For example, in some aspects, the first communication connection and the second communication connection may be associated with different RATs that support or provide different data rates or data capacities. For example, the first communication connection (e.g., the default network connection) may be associated with a lower data rate than the second communication connection. For example, the first communication connection may be associated with a 4G RAT or an LTE RAT and the second communication connection may be associated with an NR RAT, a 5G RAT, and/or a millimeter wave RAT. The one or more rules may indicate that if a throughput level of a packet or traffic satisfies the throughput threshold or the data rate threshold, then the packet or traffic should be routed to the network connection associated with a higher data rate (e.g., when the network connection associated with the higher data rate is not the default network connection).

For example, if the first communication connection is associated with a lower data rate than a data rate of the second communication connection (e.g., by a threshold margin), then the UE 120 may route traffic associated with the device 515 that has a throughput that satisfies the throughput threshold to the second communication connection (e.g., rather than the first communication connection). In some aspects, the UE 120 may measure data rates or a throughput of traffic streams from the device 515 to dynamically determine when to enforce the rule associated with the throughput threshold (e.g., such as when a data rate of the traffic stream from the device 515 satisfies the throughput threshold). In some aspects, a configuration (e.g., an OEM configuration) of the UE may indicate when the UE 120 is to enforce the rule associated with the throughput threshold. By routing traffic associated with the device 515 to the network connection with a higher data rate, the UE 120 may improve communication performance of the traffic when the traffic is associated with a high throughput.

As shown by reference number 530, the UE 120 may determine that a packet received from the device 515 is to be routed to the default network connection (e.g., the first communication connection). For example, the UE 120 may determine that one or more parameters of the packet do not satisfy or match a rule (e.g., as described above). Therefore, as shown by reference number 535, the UE 120 may route the traffic to an interface associated with the first subscription and the first SIM of the UE 120. As shown by reference number 540, the UE 120 may transmit to the packet using the first communication connection (e.g., associated with the first subscription and the first SIM). Therefore, when a packet or traffic associated with the device 515 (e.g., to be routed by the UE 120) does not satisfy a rule indicated by a configuration of the UE 120, then the UE 120 may use a default network connection for communicating the packet or traffic with a wireless network.

As shown by reference number 545, the UE 120 may determine that a packet received from the device 515 is to be routed to a network connection that is not the default network connection. For example, the UE 120 may determine that the packet is to be routed to the second communication connection associated with the second subscription and the second SIM of the UE 120. For example, the UE 120 may determine that one or more parameters (e.g., a service destination address, a service FQDN, a port number for a service, a TOS value, and/or a throughput value) of the packet satisfy a rule (e.g., associated with the second subscription) indicated by a configuration of the UE 120 (e.g., as described above).

Therefore, as shown by reference number 550, the UE 120 may route the traffic to an interface associated with the second subscription and the second SIM of the UE 120. The UE 120 may route the traffic using one or more routing rules, such as a rule indicated by an IP table, an extended Berkley packet filter (eBPF), and/or another routing protocol. In some aspects, the UE 120 may route the traffic to the interface associated with the second subscription by performing a network address translation (NAT) for the data traffic packet to translate a local address associated with the device 515 to a global address associated with the second subscription or the second SIM based at least in part on the one or more parameters of the packet satisfying or matching a rule, as described above. For example, the UE 120 may be operating in a DSDA mode. Additionally, or alternatively, the tethering connection between the UE 120 and the device

515 may be an IP version 4 (IPv4) connection in which the UE 120 performs NAT between an access point and an interface associated with a SIM of the UE 120 (e.g., using an IP table, an eBPF, and/or a hardware component, such as an IPA). For example, the UE 120 may apply a NAT rule to translate a local IP address indicated in a header of the packet to a global IP address associated with the second subscription (and/or the second SIM). In some aspects, the routing may be performed by one or more protocol stacks of the UE 120, such an IP layer protocol stack and/or a transport layer protocol stack, among other examples. For example, in some aspects, the NAT may include performing a source port translation to translate a source port indicated in a transport layer header of the packet to indicate a source port associated with the second subscription.

In some aspects, the routing may be performed by a hardware component of the UE 120. For example, a hardware component (e.g., an IPA) may be configured to filter traffic from the device 515 (e.g., as described above). The hardware component may be configured to multiplex traffic from the device 515 to a subscription or a SIM associated with a rule (e.g., the rule that the traffic or packet satisfies or matches).

In some aspects, the UE 120 may route the traffic to the interface associated with the second subscription by performing a header translation (e.g., a complete header translation) for the packet to be routed by the UE 120 (e.g., the packet received from the device 515). For example, the UE 120 may be operating in a DSDA mode. Additionally, or alternatively, the tethering connection between the UE 120 and the device 515 may be an IP version 6 (IPv6) connection in which NAT is not performed by the UE 120. For example, when using an IPv6 connection, a prefix for an address (e.g., an IP address) may be common for all devices in the network. Therefore, the UE 120 may broadcast (e.g., advertise) the prefix for the default network connection (e.g., the first communication connection) to the device 515 (e.g., via the access point of the UE 120). Therefore, when the device 515 transmits a packet to the UE 120 (e.g., that is to be routed or forwarded by the UE 120), the address indicated in a header of the packet may be based at least in part on the prefix associated with the default network connection (e.g., the first communication connection). For example, an IPv6 address may include a prefix (e.g., used for routing the packet to a destination) and an interface identifier (e.g., used to identify a source of the packet). Therefore, each device may have a unique address, but may also include the prefix associated with the default network connection (e.g., that is broadcast by the UE 120). Therefore, the UE 120 may be required to perform a header translation of the packet to route the packet to a network connection that is not the default network connection (e.g., to route the packet to the second communication connection).

Therefore, when a packet associated with the device 515 does not satisfy or match a rule (e.g., as described above), the UE 120 does not need to perform any header translation or NAT to route the traffic to the default network connection. However, the first communication connection and the second communication connection may have different prefixes. Therefore, to route the traffic to the interface associated with the second subscription and/or the second SIM, the UE 120 may modify an address indicated by the packet to indicate a prefix associated with the second communication connection.

For example, the UE 120 may receive a packet from the device 515 indicating a source address associated with the first subscription (e.g., indicating a prefix associated with the first subscription and/or the first communication connection) in a header of the packet. The UE 120 may perform a header translation for the header of the packet to modify the source address associated with the first subscription to a source address for routing the data traffic packet to an interface associated with the second subscription (and/or to the second communication connection). In some aspects, the UE 120 may modify the header to indicate at least one of the source address associated with the second subscription (e.g., a source address used by the UE 120 for the second communication connection) or a source address that is based at least in part on a prefix of the source address associated with the second subscription (e.g., the UE 120 may generate a new source address using the prefix associated with the second communication connection). In some aspects, if the UE 120 generates a new source address using the prefix associated with the second communication connection, the UE 120 may perform one or more actions to determine or ensure that the generated new source address is not a duplicate of an already existing source address. In some aspects, the UE 120 may perform one or more transport layer header checksum updates based at least in part on modifying the source address of the packet in the IP header of the packet (e.g., as described above).

As described above, in some aspects, the UE 120 may perform the header translation of a packet associated with the device 515 (e.g., to route the packet to the second communication connection) using a protocol stack of the UE 120 and/or a hardware component of the UE 120 (e.g., an IPA). For example, a hardware component of the UE 120 may be configured to filter the traffic received from the device 515, identify traffic to be routed to a non-default data connection (e.g., the second communication connection), perform a header translation, and route the traffic to an interface associated with the non-default data connection.

In some aspects, the UE 120 may route the traffic to the interface associated with the second subscription by performing a DDS switch. For example, the UE 120 may be operating in the DSDS mode. As described above, the first subscription of the UE 120 may be a DDS subscription such that the first communication connection is an active connection in the DSDS mode. The UE 120 may route the traffic to the interface associated with the second subscription by performing a DDS switch to modify the first subscription to be the non-DDS of the UE 120 and the second subscription to be the DDS of the UE 120. The DDS switch may be a permanent DDS switch or a temporary DDS switch. By performing the DDS switch, the UE 120 may be enabled to establish an active (e.g., connected) session on the second communication connection and route traffic for tethered devices (e.g., the device 515) using the second communication connection.

In some aspects, the UE 120 may have tethering connections with multiple devices. Additionally, or alternatively, a tethered device may be communicating traffic over the tethering connection that is associated with multiple services and/or multiple applications. Therefore, in some cases, the UE 120 may receive first traffic that is better served by a non-default subscription (e.g., traffic that satisfies or matches a rule as described above) and second traffic that may not be better served by the non-default subscription (e.g., traffic that does not satisfy or match a rule as described above). However, in the DSDS mode, only one subscription may be active at a time. Therefore, to determine which subscription should be associated with an active network connection (e.g., which subscription is to be the DDS of the UE 120) in the DSDS mode, the UE 120 may determine the DDS of the UE 120, from the first subscription or the second subscription, based at least in part on a time of arrival of traffic at the UE 120 in a first come first serve manner and/or on a priority associated with the traffic at the UE 120, among other examples. For example, if the first traffic arrives at the UE 120 before the second traffic, then the UE 120 may perform a DDS switch to enable the first traffic to be routed to the second subscription and/or the second communication connection. Additionally, or alternatively, if the first traffic is associated with a higher priority than a priority of the second traffic, then the UE 120 may perform a DDS switch to enable the first traffic to be routed to the second subscription and/or the second communication connection.

In some aspects, the UE 120 may determine whether to route traffic associated with a tethered device (e.g., the device 515) to a non-default network connection based at least in part on a measurement of the non-default network connection. For example, the UE 120 may perform a measurement of a measurement parameter (e.g., an RSRP parameter, an RSRQ parameter, and/or a signal-to-noise ratio (SNR) parameter) of the second communication connection. The UE 120 may determine whether a value of the measurement parameter satisfies a threshold (e.g., indicated by a configuration of the UE 120, such as an OEM configuration). If the value of the measurement parameter satisfies the threshold, then the UE 120 may route traffic (e.g., packets) associated with the device 515 to the second communication connection (e.g., in a similar manner as described herein). If the value of the measurement parameter does not satisfy the threshold, then the UE 120 may refrain from routing traffic associated with the device 515 to the second communication connection in accordance with the configuration based at least in part on the determination that the value of the measurement parameter does not satisfy the threshold. Therefore, the UE 120 may avoid routing traffic associated with the device 515 to a non-default network connection when the non-default network connection is associated with poor service (e.g., a measurement parameter that does not satisfy the threshold). As a result, communication performance of the traffic associated with the device 515 may be improved.

While aspects above have been described in connection with routing traffic to a subscription or a SIM that is not a default subscription or SIM for data traffic, similar techniques may be applied to route traffic received from the device 515 to a network slice that is not a default network slice for data traffic. For example, as described above, network slicing may allow for multiple virtual networks to run on a single physical network to support multiple services, applications, and/or entities (e.g., end users, customers, such as organizations that provide a service to end users of the wireless telecommunications systems). Therefore, the wireless network may be enabled to serve different industries and/or domains that have distinct service needs, which may be reflected by different quality of service (QoS) requirements for different aspects of service performance and/or quality represented by correspondingly different QoS parameters. For example, the UE 120 may be associated with multiple network slices for a single network connection, such as an enhanced mobile broadband (eMBB) service slice, an ultra-reliable, low-latency (URLLC) service slice, and/or a mobile Internet of Things (mIoT) service slice, among other examples.

As described above, a communication connection (e.g., the first communication connection and/or the second communication connection) may be associated with a default network slice for data traffic (e.g., for internet traffic). In a typical scenario, the UE 120 may use the default network slice for routing traffic for tethered devices (e.g., for the device 515). However, if traffic (e.g., a packet) from the device 515 satisfies or matches a rule (e.g., in a similar manner as described above), then the UE 120 may route traffic associated with the device 515 to a different network slice (e.g., rather than the default network slice). This may enable the traffic to experience improved performance that is provided by the different network slice (e.g., such as an incentive associated with a service or application of the traffic that is provided by the different network slice). For example, traffic associated with the device 515 may be associated with a low latency application or service (e.g., a gaming application or service, or another low latency service). Therefore, the traffic may be better served by a low latency network slice (e.g., a URLLC network slice) rather than a default network slice (e.g., an eMBB network slice). Therefore, the UE 120 may route the traffic associated with the device 515 to the different network slice (e.g., the low latency network slice) to improve the communication performance of the traffic associated with the device 515.

In some aspects, one or more rules for routing tethered traffic to a network slice that is not the default network slice may be indicated in a configuration of the UE 120 (e.g., an OEM configuration). Additionally, or alternatively, the one or more rules may be indicated in a UE route selection policy (URSP). For example, the UE 120 may receive an indication of one or more URSP rules for identifying traffic that is to be routed to a non-default network slice. The UE 120 may route the traffic associated with the device 515 to a network slice that is not the default network slice based at least in part on determining that one or more parameters of a packet received from the device 515 satisfy at least one of the rule indicated by the configuration (e.g., the OEM configuration) and/or a URSP rule of the one or more URSP rules.

For example, in some cases, traffic associated with tethered devices (e.g., the device 515) may be routed to the default network connection (e.g., the network connection associated with the first SIM and/or the first subscription) and to a network slice associated that is not the default network slice associated with the default network connection. In some aspects, the UE 120 may route traffic associated with tethered devices (e.g., the device 515) to a subscription that is not a default subscription of the UE 120 and/or to a network slice that is not a default network slice for a network connection. For example, in some aspects, the UE 120 may route a packet (e.g., received from the device 515) to the second subscription of the UE 120 (e.g., to an interface of the second subscription and/or to the second communication connection). Additionally, or alternatively, the UE 120 may route the packet to a network slice (e.g., associated with the second communication connection) that is not a default network slice for data traffic. In this way, the UE 120 may ensure that traffic associated with a tethered device is routed to use a subscription and/or a network slice that provides the best performance (e.g., incentivized performance, reduced latency performance, and/or improved data rate performance) for the traffic.

As shown by reference number 555, the UE 120 may transmit traffic (e.g., a packet) associated with the device 515 using the second communication connection (e.g., the non-default data connection for the UE 120 and/or the network connection associated with the second subscription). For example, based at least in part on routing the traffic associated with the device 515 to an interface associated with the second subscription (e.g., as described above), the UE 120 may transmit the traffic associated with the device 515 to the second base station 510 using the second communication connection. Additionally, or alternatively, the UE 120 may transmit traffic (e.g., a packet) associated with the device 515 using a non-default network slice (e.g., of the first communication connection or the second communication connection) based at least in part on routing the traffic to the non-default network slice as described above.

As a result, the UE 120 may be enabled to route traffic associated with a tethered device (e.g., the device 515) to a subscription or a network slice that best serves the traffic associated with the tethered device. For example, the UE 120 may be enabled to use a data connection or a network slice other than the default data connection or the default network slice for traffic associated with a tethered device. By enabling the UE 120 to filter the traffic associated with a tethered device to a data connection or a network slice other than the default data connection or the default network slice, communication performance of the traffic may be improved. For example, a tethered device may be enabled to realize benefits of incentives associated with using a subscription that is not the default data subscription of the UE 120. Additionally, or alternatively, the tethered device may experience improved data rates or reduced latency by using a data connection or a network slice, other than the default data connection or the default network slice, that better serves the traffic associated with the tethered device.

As indicated above, FIG. 5 is provided as an example. Other examples may differ from what is described with regard to FIG. 5.

Figure 6:
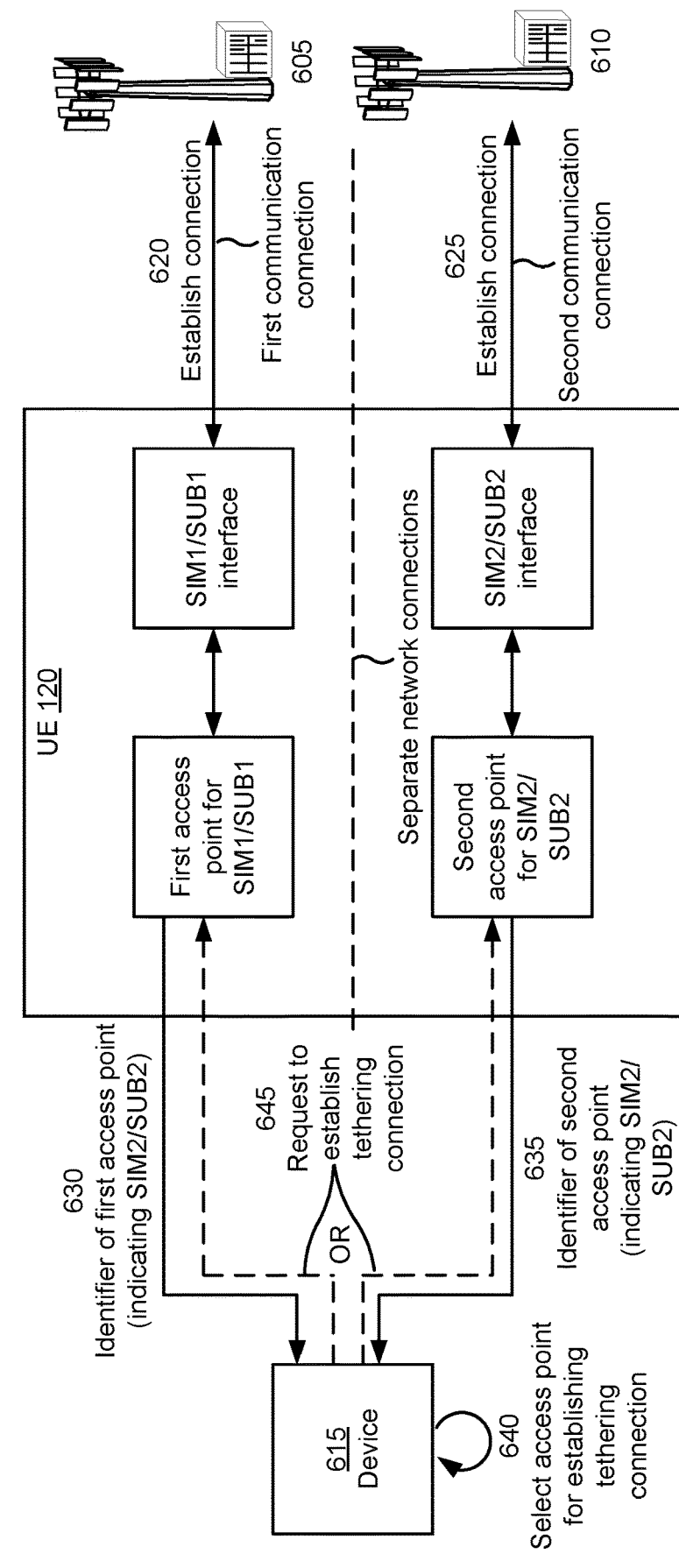
FIG. 6 is a diagram illustrating an example associated with subscription based or network slice based traffic differentiation and routing with multiple access points, in accordance with the present disclosure.

FIG. 6 is a diagram illustrating an example 600 of subscription based or network slice based traffic differentiation and routing with multiple access points, in accordance with the present disclosure. As shown in FIG. 6, a UE 120 may communicate with a first base station 605 and a second base station 610. For example, the UE 120 may be a multi-SIM UE (e.g., in a similar manner as described above in connection with FIG. 4). The first base station 605 may be associated with a first SIM (and/or a first subscription) of the UE 120. For example, the first base station 605 may provide a cell for a wireless network associated with a first network operator. The first network operator may be associated with the first SIM (and/or the first subscription) of the UE 120. Similarly, the second base station 610 may be associated with a second SIM (and/or a second subscription) of the UE 120. For example, the second base station 610 may provide a cell for a wireless network associated with a second network operator. The second network operator may be associated with the second SIM (and/or the second subscription) of the UE 120. The first base station 605 and/or the second base station 610 may be a base station 110 and/or a network entity, such as a CU, a DU, and/or an RU, among other examples.

As shown in FIG. 6, the UE 120 may provide a tethering service and/or a hotspot service (e.g., in a similar manner as described above in connection with FIGS. 3, 4, and 5). For example, the UE 120 may communicate with a device 615. The UE 120 may provide a wireless (e.g., cellular) network connection for the device 615 to enable the device 615 to access a wireless network associated with the UE 120 (e.g., in a similar manner as described above in connection with FIGS. 3 and 4). For example, the UE 120 may route traffic associated with the device 615 to and/or from a wireless network (e.g., associated with the first base station 605 or the second base station 610).

For example, as shown by reference number 620, the UE 120 may establish a first communication connection with the first base station 605. The first communication connection may be associated with the first subscription and/or the first SIM of the UE 120. As shown by reference number 625, the UE 120 may establish a second communication connection with the second base station 610. The second communication connection may be associated with the second subscription and/or the second SIM of the UE 120.

As shown in FIG. 6, the UE 120 may include a first access point (e.g., a first WLAN access point and/or a first Wi-Fi access point) and a second access point (e.g., a second WLAN access point and/or a second Wi-Fi access point). The first access point and the second access point may be separate access points. For example, the first access point may provide a first WLAN associated with the UE 120 and the second access point may provide a second WLAN associated with the UE 120. As shown in FIG. 6, the first access point and the second access point may be associated with separate communication connections (e.g., to a wireless network). For example, the UE 120 may establish a connection for the first access point with an interface for the first subscription (e.g., such that the first access point is associated with the first communication connection and/or a network operator associated with the first communication connection). Similarly, the UE 120 may establish a connection for the second access point with an interface for the second subscription (e.g., such that the second access point is associated with the second communication connection and/or a network operator associated with the second communication connection).

As shown by reference number 630, the UE 120 may transmit (e.g., broadcast) an identifier associated with the first access point. The first identifier may be a network identifier associated with a WLAN or a Wi-Fi network provided by the first access point. The first identifier may indicate that the first access point is associated with the first subscription. In some aspects, the first identifier may be an SSID of the first access point that indicates or identifies the first subscription.

As shown by reference number 635, the UE 120 may transmit (e.g., broadcast) an identifier associated with the second access point. The second identifier may be a network identifier associated with a WLAN or a Wi-Fi network provided by the second access point. The second identifier may indicate that the second access point is associated with the second subscription. In some aspects, the second identifier may be an SSID of the second access point that indicates or identifies the second subscription. Therefore, the device 615 may be enabled to identify (based at least in part on the first identifier and the second identifier) that establishing a tethering connection using the first access point will result in the UE 120 routing traffic associated with the device 615 to the first subscription and/or the first communication connection. Similarly, the device 615 may be enabled to identify (based at least in part on the first identifier and the second identifier) that establishing a tethering connection using the second access point will result in the UE 120 routing traffic associated with the device 615 to the second subscription and/or the second communication connection.

As shown by reference number 640, the device 615 may select an access point (e.g., a WLAN or a Wi-Fi network) to use for establishing a tethering connection with the UE 120. For example, the device 615 may select an access point based at least in part on the first identifier and the second identifier broadcast by the UE 120. In some aspects, the device 615 may select an access point based at least in part on a user input. In some aspects, the device 615 may select an access point based at least in part on an application or service executing on the device 615. For example, the device 615 may be enabled to select an access point of the UE 120 that is associated with a subscription that will provide an improved service (e.g., an incentivized service) for traffic associated with the device 615.

As shown by reference number 645, the device 615 may transmit, and the UE 120 may receive, a connection establishment request for establishing a tethering connection with the UE 120. As shown in FIG. 6, if the device 615 selects the first access point for establishing the tethering connection, then the request for establishing the tethering connection may be associated with the first access point. The UE 120 may establish the tethering connection with the device 615 using the first access point (e.g., and a WLAN or Wi-Fi network provided by the first access point). The UE 120 may route traffic associated with the device 615 to the first subscription and/or the first communication connection.

Alternatively, if the device 615 selects the second access point for establishing the tethering connection, then the request for establishing the tethering connection may be associated with the second access point. The UE 120 may establish the tethering connection with the device 615 using the second access point (e.g., and a WLAN or Wi-Fi network provided by the second access point). The UE 120 may route traffic associated with the device 615 to the second subscription and/or the second communication connection. As a result, by broadcasting the first identifier and the second identifier that indicate which subscription of the UE 120 an access point is associated with, the UE 120 may enable traffic for tethered devices to be routed to a subscription that provides the best service for the traffic.

As indicated above, FIG. 6 is provided as an example. Other examples may differ from what is described with regard to FIG. 6.

FIG. 7 is a diagram illustrating an example process 700 performed, for example, by a UE, in accordance with the present disclosure. Example process 700 is an example where the UE (e.g., UE 120) performs operations associated with subscription based or network slice based traffic differentiation and routing.

As shown in FIG. 7, in some aspects, process 700 may include establishing a first communication connection associated with a first subscription of the UE or associated with a first network slice, wherein the first communication connection is a default connection for the UE for data traffic (block 710). For example, the UE (e.g., using communication connection establishment component 908, depicted in FIG. 9) may establish a first communication connection associated with a first subscription of the UE or associated with a first network slice, wherein the first communication connection is a default connection for the UE for data traffic, as described above.

As further shown in FIG. 7, in some aspects, process 700 may include establishing a second communication connection associated with a second subscription of the UE or associated with a second network slice (block 720). For example, the UE (e.g., using communication connection establishment component 908, depicted in FIG. 9) may establish a second communication connection associated with a second subscription of the UE or associated with a second network slice, as described above.

As further shown in FIG. 7, in some aspects, process 700 may include receiving, from a device via a wireless local area network provided by the UE or via a wired connection, a data traffic packet associated with one or more parameters (block 730). For example, the UE (e.g., using reception component 902, depicted in FIG. 9) may receive, from a device via a wireless local area network provided by the UE or via a wired connection, a data traffic packet associated with one or more parameters, as described above.

As further shown in FIG. 7, in some aspects, process 700 may include routing the data traffic packet to the second communication connection based at least in part on the one or more parameters (block 740). For example, the UE (e.g., using traffic routing component 910, depicted in FIG. 9) may route the data traffic packet to the second communication connection based at least in part on the one or more parameters, as described above.

As further shown in FIG. 7, in some aspects, process 700 may include transmitting the data traffic packet using the second communication connection (block 750). For example, the UE (e.g., using transmission component 904, depicted in FIG. 9) may transmit the data traffic packet using the second communication connection, as described above.

Process 700 may include additional aspects, such as any single aspect or any combination of aspects described below and/or in connection with one or more other processes described elsewhere herein.

In a first aspect, process 700 includes determining (e.g., using determination component 912, depicted in FIG. 9) whether the one or more parameters satisfy a rule indicated by a configuration of the UE, and determining (e.g., using determination component 912, depicted in FIG. 9) whether to route the data traffic packet to the first communication connection or to the second communication connection based at least in part on the determination of whether the one or more parameters satisfy the rule indicated by the configuration.

In a second aspect, alone or in combination with the first aspect, routing the data traffic packet to the second communication connection comprises performing (e.g., using traffic routing component 910, depicted in FIG. 9) a NAT for the data traffic packet to translate a local address associated with the device to a global address associated with the second subscription based at least in part on the one or more parameters satisfying a rule, and routing (e.g., using traffic routing component 910, depicted in FIG. 9) the data traffic packet to the second communication connection for the second subscription based at least in part on the performance of the NAT.

In a third aspect, alone or in combination with one or more of the first and second aspects, performing the NAT comprises applying (e.g., using traffic routing component 910, depicted in FIG. 9) a NAT rule to translate a local IP address indicated in a header of the data traffic packet to a global IP address associated with the second subscription based at least in part on the one or more parameters satisfying a rule.

In a fourth aspect, alone or in combination with one or more of the first through third aspects, the wireless local area network is an IPv4 network.

In a fifth aspect, alone or in combination with one or more of the first through fourth aspects, receiving the data traffic packet comprises receiving (e.g., using reception component 902, depicted in FIG. 9) the data traffic packet indicating a source address associated with the first subscription in a header of the data traffic packet, and routing the data traffic packet to the second communication connection comprises performing (e.g., using traffic routing component 910, depicted in FIG. 9) a header translation for the header of the data traffic packet to modify the source address associated with the first subscription to a source address for routing the data traffic packet to the second subscription.

In a sixth aspect, alone or in combination with one or more of the first through fifth aspects, performing the header translation for the header of the data traffic packet comprises modifying (e.g., using traffic routing component 910, depicted in FIG. 9) the header to indicate at least one of the source address associated with the second subscription or a source address that is based at least in part on a prefix of the source address associated with the second subscription.

In a seventh aspect, alone or in combination with one or more of the first through sixth aspects, performing the header translation for the header of the data traffic packet comprises updating (e.g., using traffic routing component 910, depicted in FIG. 9) at least one of an internet protocol layer header of the data traffic packet or a transport layer header of the data traffic packet.

In an eighth aspect, alone or in combination with one or more of the first through seventh aspects, the wireless local area network is an IPv6 network.

In a ninth aspect, alone or in combination with one or more of the first through eighth aspects, a configuration of the UE indicates one or more rules for identifying traffic that is to be routed to a non-default data subscription of the UE.

In a tenth aspect, alone or in combination with one or more of the first through ninth aspects, the one or more rules indicate at least one of a service destination address of traffic to be routed to the non-default data subscription, a service FQDN of traffic to be routed to the non-default data subscription, a port number of traffic to be routed to the non-default data subscription, or a type of service value of traffic to be routed to the non-default data subscription.

In an eleventh aspect, alone or in combination with one or more of the first through tenth aspects, a configuration of the UE indicates one or more rules that are specific to an identifier associated with the second subscription.

In a twelfth aspect, alone or in combination with one or more of the first through eleventh aspects, the identifier includes at least one of a mobile country code or a mobile network code.

In a thirteenth aspect, alone or in combination with one or more of the first through twelfth aspects, routing the data traffic packet to the second communication connection comprises determining (e.g., using determination component 912, depicted in FIG. 9) that the one or more parameters satisfy a rule indicated by a configuration, and routing (e.g., using traffic routing component 910, depicted in FIG. 9) the data traffic packet to the second network slice based at least in part on the determination that the one or more parameters satisfy the rule indicated by the configuration.

In a fourteenth aspect, alone or in combination with one or more of the first through thirteenth aspects, process 700 includes receiving (e.g., using reception component 902, depicted in FIG. 9) an indication of one or more URSP rules for identifying traffic that is to be routed to a non-default network slice, and routing the data traffic packet to the second communication connection comprises determining (e.g., using determination component 912, depicted in FIG. 9) that the one or more parameters satisfy at least one of a rule indicated by a configuration or a URSP rule of the one or more URSP rules.

In a fifteenth aspect, alone or in combination with one or more of the first through fourteenth aspects, routing the data traffic packet to the second communication connection comprises routing (e.g., using traffic routing component 910, depicted in FIG. 9) the data traffic packet to the second subscription of the UE, and routing (e.g., using traffic routing component 910, depicted in FIG. 9) the data traffic packet to the second network slice, where the second network slice is a non-default network slice associated with the second subscription.

In a sixteenth aspect, alone or in combination with one or more of the first through fifteenth aspects, process 700 includes measuring (e.g., using measurement component 914, depicted in FIG. 9) a measurement parameter of the second communication connection.

In a seventeenth aspect, alone or in combination with one or more of the first through sixteenth aspects, routing the data traffic packet to the second communication connection comprises determining (e.g., using determination component 912, depicted in FIG. 9) that a value of the measurement parameter satisfies a threshold, and routing (e.g., using traffic routing component 910, depicted in FIG. 9) the data traffic packet to the second communication connection based at least in part on the determination that the value of the measurement parameter satisfies the threshold.

In an eighteenth aspect, alone or in combination with one or more of the first through seventeenth aspects, process 700 includes determining (e.g., using determination component 912, depicted in FIG. 9) that a value of the measurement parameter does not satisfy a threshold, and refraining (e.g., using traffic routing component 910, depicted in FIG. 9) from routing traffic to the second communication connection in accordance with a configuration of the UE based at least in part on the determination that the value of the measurement parameter does not satisfy the threshold.

In a nineteenth aspect, alone or in combination with one or more of the first through eighteenth aspects, the first subscription is a DDS and the second subscription is not a DDS, and routing the data traffic packet to the second communication connection comprises performing (e.g., using traffic routing component 910, depicted in FIG. 9) a DDS switch to modify the first subscription to not be the DDS and the second subscription to be the DDS.

In a twentieth aspect, alone or in combination with one or more of the first through nineteenth aspects, the UE is operating in a DSDS mode, and routing the data traffic packet to the second communication connection comprises determining (e.g., using determination component 912, depicted in FIG. 9) a default data subscription, from the first subscription or the second subscription, based at least in part on a time of arrival of traffic at the UE in a first come first serve manner or on a priority associated with the traffic at the UE.

In a twenty-first aspect, alone or in combination with one or more of the first through twentieth aspects, the one or more parameters indicate a throughput level associated with the data traffic packet, and routing the data traffic packet to the second communication connection comprises determining (e.g., using determination component 912, depicted in FIG. 9) that the throughput level associated with the data traffic packet satisfies a throughput threshold, and routing (e.g., using traffic routing component 910, depicted in FIG. 9) the data traffic packet to the second communication connection based at least in part on the determination that the throughput level associated with the data traffic packet satisfies the throughput threshold.

In a twenty-second aspect, alone or in combination with one or more of the first through twenty-first aspects, the first communication connection is associated with a first RAT and the second communication connection is associated with a second RAT.

In a twenty-third aspect, alone or in combination with one or more of the first through twenty-second aspects, the second RAT is at least one of a 5G RAT, a New Radio RAT, or a millimeter wave RAT.

In a twenty-fourth aspect, alone or in combination with one or more of the first through twenty-third aspects, process 700 includes measuring (e.g., using measurement component 914, depicted in FIG. 9) a data rate associated with a traffic stream received from the device, and routing (e.g., using traffic routing component 910, depicted in FIG. 9) the data traffic packet to the second communication connection based at least in part on the measurement of the data rate satisfying the throughput threshold.

In a twenty-fifth aspect, alone or in combination with one or more of the first through twenty-fourth aspects, the UE is operating in a DSDS mode, and routing the data traffic packet to the second communication connection comprises performing (e.g., using traffic routing component 910, depicted in FIG. 9) a DDS to switch the DDS of the UE from the first subscription to the second subscription.

In a twenty-sixth aspect, alone or in combination with one or more of the first through twenty-fifth aspects, the UE is operating in a multiple subscriber identity module mode.

In a twenty-seventh aspect, alone or in combination with one or more of the first through twenty-sixth aspects, the UE is operating in a dual subscriber identity module dual active mode.

In a twenty-eighth aspect, alone or in combination with one or more of the first through twenty-seventh aspects, the UE is operating in a single subscriber identity module mode.

In a twenty-ninth aspect, alone or in combination with one or more of the first through twenty-eighth aspects, routing the data traffic packet to the second communication connection comprises routing (e.g., using traffic routing component 910, depicted in FIG. 9) the data traffic packet to the second communication via a hardware component of the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a UE, in accordance with the present disclosure. Example process 800 is an example where the UE (e.g., UE 120) performs operations associated with subscription based or network slice based traffic differentiation and routing.

As shown in FIG. 8, in some aspects, process 800 may include establishing a first communication connection for a first subscription of the UE, wherein the first communication connection is associated with a first access point (block 810). For example, the UE (e.g., using communication connection establishment component 908, depicted in FIG. 9) may establish a first communication connection for a first subscription of the UE, wherein the first communication connection is associated with a first access point, as described above.

As further shown in FIG. 8, in some aspects, process 800 may include establishing a second communication connection for a second subscription of the UE, wherein the second communication connection is associated with a second access point (block 820). For example, the UE (e.g., using communication connection establishment component 908, depicted in FIG. 9) may establish a second communication connection for a second subscription of the UE, wherein the second communication connection is associated with a second access point, as described above.

As further shown in FIG. 8, in some aspects, process 800 may include transmitting a first identifier associated with the first access point and a second identifier associated with the second access point, wherein the first identifier indicates that the first access point is associated with the first subscription and the second identifier indicates that the second access point is associated with the second subscription (block 830). For example, the UE (e.g., using transmission component 904, depicted in FIG. 9) may transmit a first identifier associated with the first access point and a second identifier associated with the second access point, wherein the first identifier indicates that the first access point is associated with the first subscription and the second identifier indicates that the second access point is associated with the second subscription, as described above.

As further shown in FIG. 8, in some aspects, process 800 may include receiving, from a device, a connection establishment request for establishing a tethering connection for the device using the first communication connection or the second communication connection based at least in part on the transmission of the first identifier and the second identifier (block 840). For example, the UE (e.g., using reception component 902, depicted in FIG. 9) may receive, from a device, a connection establishment request for establishing a tethering connection for the device using the first communication connection or the second communication connection based at least in part on the transmission of the first identifier and the second identifier, as described above.

Process 800 may include additional aspects, such as any single aspect or any combination of aspects described below and/or in connection with one or more other processes described elsewhere herein.

Figure 9:
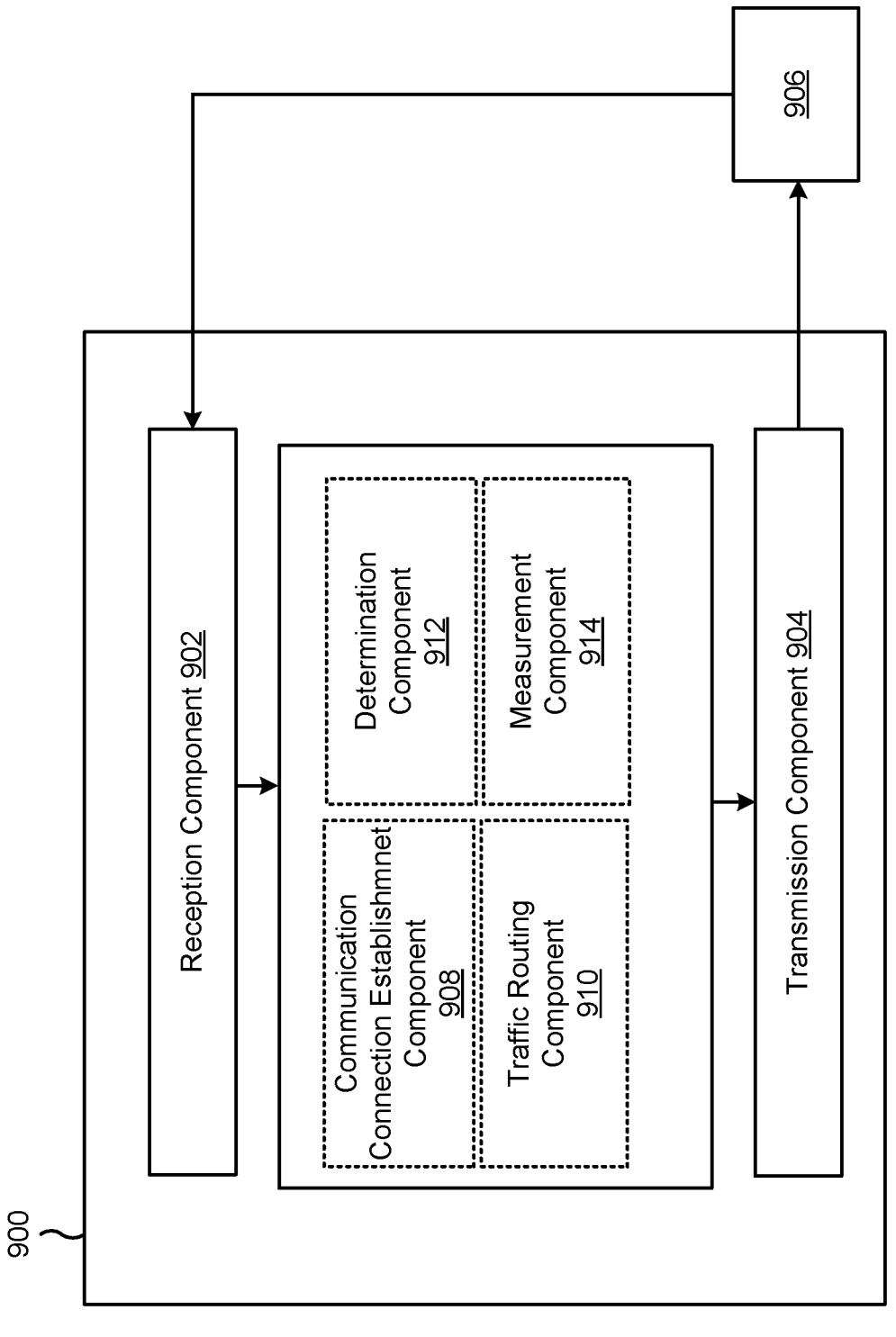
FIG. 9 is a block diagram of an example apparatus for wireless communication, in accordance with the present disclosure.

In a first aspect, process 800 includes establishing (e.g., using communication connection establishment component 908, depicted in FIG. 9) the tethering connection for the device using the first communication connection or the second communication connection based at least in part on the reception of the connection establishment request.

In a second aspect, alone or in combination with the first aspect, the first communication connection and the second communication connection are separate communication connections.

In a third aspect, alone or in combination with one or more of the first and second aspects, transmitting the first identifier associated with the first access point and the second identifier associated with the second access point comprises transmitting (e.g., using transmission component 904, depicted in FIG. 9) a first SSID of the first access point that indicates the first subscription, and transmitting (e.g., using transmission component 904, depicted in FIG. 9) a second SSID of the second access point that indicates the second subscription.

In a fourth aspect, alone or in combination with one or more of the first through third aspects, receiving the connection establishment request is based at least in part on traffic to be routed by the UE from the device being associated with a subscription of the first subscription or the second subscription.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a communication connection establishment component 908, a traffic routing component 910, a determination component 912, and/or a measurement component 914, among other examples.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The communication connection establishment component 908 may establish a first communication connection associated with a first subscription of the UE or associated with a first network slice, wherein the first communication connection is a default connection for the UE for data traffic. The communication connection establishment component 908 may establish a second communication connection associated with a second subscription of the UE or associated with a second network slice. The reception component 902 may receive, from a device via a wireless local area network provided by the UE or a via wired connection, a data traffic packet associated with one or more parameters. The traffic routing component 910 may route the data traffic packet to the second communication connection based at least in part on the one or more parameters. The transmission component 904 may transmit the data traffic packet using the second communication connection.

The determination component 912 may determine whether the one or more parameters satisfy a rule indicated by a configuration of the UE. The determination component 912 may determine whether to route the data traffic packet to the first communication connection or to the second communication connection based at least in part on the determination of whether the one or more parameters satisfy the rule indicated by the configuration.

The reception component 902 may receive an indication of one or more URSP rules for identifying traffic that is to be routed to a non-default network slice.

The measurement component 914 may measure a measurement parameter of the second communication connection. The determination component 912 may determine that a value of the measurement parameter does not satisfy a threshold. The traffic routing component 910 may refrain from routing traffic to the second communication connection in accordance with a configuration of the UE based at least in part on the determination that the value of the measurement parameter does not satisfy the threshold.

The measurement component 914 may measure a data rate associated with a traffic stream received from the device. The traffic routing component 910 may route the data traffic packet to the second communication connection based at least in part on the measurement of the data rate satisfying the throughput threshold.

The communication connection establishment component 908 may establish a first communication connection for a first subscription of the UE, wherein the first communication connection is associated with a first access point. The communication connection establishment component 908 may establish a second communication connection for a second subscription of the UE, wherein the second communication connection is associated with a second access point. The transmission component 904 may transmit a first identifier associated with the first access point and a second identifier associated with the second access point, wherein the first identifier indicates that the first access point is associated with the first subscription and the second identifier indicates that the second access point is associated with the second subscription. The reception component 902 may receive, from a device, a connection establishment request for establishing a tethering connection for the device using the first communication connection or the second communication connection based at least in part on the transmission of the first identifier and the second identifier.

The communication connection establishment component 908 may establish the tethering connection for the device using the first communication connection or the second communication connection based at least in part on the reception of the connection establishment request.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: establishing a first communication connection associated with a first subscription of the UE or associated with a first network slice, wherein the first communication connection is a default connection for the UE for data traffic; establishing a second communication connection associated with a second subscription of the UE or associated with a second network slice; receiving, from a device via a wireless local area network provided by the UE or via a wired connection, a data traffic packet associated with one or more parameters; routing the data traffic packet to the second communication connection based at least in part on the one or more parameters; and transmitting the data traffic packet using the second communication connection.

Aspect 2: The method of Aspect 1, further comprising: determining whether the one or more parameters satisfy a rule indicated by a configuration of the UE; and determining whether to route the data traffic packet to the first communication connection or to the second communication connection based at least in part on the determination of whether the one or more parameters satisfy the rule indicated by the configuration.

Aspect 3: The method of any of Aspects 1-2, wherein routing the data traffic packet to the second communication connection comprises: performing a network address translation (NAT) for the data traffic packet to translate a local address associated with the device to a global address associated with the second subscription based at least in part on the one or more parameters satisfying a rule; and routing the data traffic packet to the second communication connection for the second subscription based at least in part on the performance of the NAT.

Aspect 4: The method of Aspect 3, wherein performing the NAT comprises: applying a NAT rule to translate a local internet protocol (IP) address indicated in a header of the data traffic packet to a global IP address associated with the second subscription based at least in part on the one or more parameters satisfying a rule.

Aspect 5: The method of any of Aspects 3-4, wherein the wireless local area network is an internet protocol (IP) version 4 (IPv4) network.

Aspect 6: The method of any of Aspects 1-2, wherein receiving the data traffic packet comprises: receiving the data traffic packet indicating a source address associated with the first subscription in a header of the data traffic packet; and wherein routing the data traffic packet to the second communication connection comprises: performing a header translation for the header of the data traffic packet to modify the source address associated with the first subscription to a source address for routing the data traffic packet to the second subscription.

Aspect 7: The method of Aspect 6, wherein performing the header translation for the header of the data traffic packet comprises: modifying the header to indicate at least one of the source address associated with the second subscription or a source address that is based at least in part on a prefix of the source address associated with the second subscription.

Aspect 8: The method of any of Aspects 6-7, wherein performing the header translation for the header of the data traffic packet comprises: updating at least one of an internet protocol layer header of the data traffic packet or a transport layer header of the data traffic packet.

Aspect 9: The method of any of Aspects 6-8, wherein the wireless local area network is an internet protocol (IP) version 6 (IPv6) network.

Aspect 10: The method of any of Aspects 1-9, wherein a configuration of the UE indicates one or more rules for identifying traffic that is to be routed to a non-default data subscription of the UE.

Aspect 11: The method of Aspect 10, wherein the one or more rules indicate at least one of: a service destination address of traffic to be routed to the non-default data subscription, a service fully qualified domain name (FQDN) of traffic to be routed to the non-default data subscription, a port number of traffic to be routed to the non-default data subscription, or a type of service value of traffic to be routed to the non-default data subscription.

Aspect 12: The method of any of Aspects 1-11, wherein a configuration of the UE indicates one or more rules that are specific to an identifier associated with the second subscription.

Aspect 13: The method of Aspect 12, wherein the identifier includes at least one of a mobile country code or a mobile network code.

Aspect 14: The method of any of Aspects 1-13, wherein routing the data traffic packet to the second communication connection comprises: determining that the one or more parameters satisfy a rule indicated by a configuration; and routing the data traffic packet to the second network slice based at least in part on the determination that the one or more parameters satisfy the rule indicated by the configuration.

Aspect 15: The method of any of Aspects 1-14, further comprising: receiving an indication of one or more UE route selection policy (URSP) rules for identifying traffic that is to be routed to a non-default network slice; and wherein routing the data traffic packet to the second communication connection comprises: determining that the one or more parameters satisfy at least one of a rule indicated by a configuration or a URSP rule of the one or more URSP rules.

Aspect 16: The method of any of Aspects 1-15, wherein routing the data traffic packet to the second communication connection comprises: routing the data traffic packet to the second subscription of the UE; and routing the data traffic packet to the second network slice, wherein the second network slice is a non-default network slice associated with the second subscription.

Aspect 17: The method of any of Aspects 1-16, further comprising: measuring a measurement parameter of the second communication connection.

Aspect 18: The method of Aspect 17, wherein routing the data traffic packet to the second communication connection comprises: determining that a value of the measurement parameter satisfies a threshold; and routing the data traffic packet to the second communication connection based at least in part on the determination that the value of the measurement parameter satisfies the threshold.

Aspect 19: The method of Aspect 17, further comprising: determining that a value of the measurement parameter does not satisfy a threshold; and refraining from routing traffic to the second communication connection in accordance with a configuration of the UE based at least in part on the determination that the value of the measurement parameter does not satisfy the threshold.

Aspect 20: The method of any of Aspects 1-19, wherein the first subscription is a default data subscription (DDS) and the second subscription is not a DDS, and wherein routing the data traffic packet to the second communication connection comprises: performing a DDS switch to modify the first subscription to not be the DDS and the second subscription to be the DDS.

Aspect 21: The method of any of Aspects 1-20, wherein the UE is operating in a dual subscriber identity module (SIM) dual standby (DSDS) mode, and wherein routing the data traffic packet to the second communication connection comprises: determining a default data subscription, from the first subscription or the second subscription, based at least in part on a time of arrival of traffic at the UE in a first come first serve manner or on a priority associated with the traffic at the UE.

Aspect 22: The method of any of Aspects 1-21, wherein the one or more parameters indicate a throughput level associated with the data traffic packet, and wherein routing the data traffic packet to the second communication connection comprises: determining that the throughput level associated with the data traffic packet satisfies a throughput threshold; and routing the data traffic packet to the second communication connection based at least in part on the determination that the throughput level associated with the data traffic packet satisfies the throughput threshold.

Aspect 23: The method of Aspect 22, wherein the first communication connection is associated with a first radio access technology (RAT) and the second communication connection is associated with a second RAT.

Aspect 24: The method of Aspect 23, wherein the second RAT is at least one of a 5G RAT, a New Radio RAT, or a millimeter wave RAT.

Aspect 25: The method of any of Aspects 22-24, further comprising: measuring a data rate associated with a traffic pattern received from the device; and routing the data traffic packet to the second communication connection based at least in part on the measurement of the data rate satisfying the throughput threshold.

Aspect 26: The method of any of Aspects 22-25, wherein the UE is operating in a dual subscriber identity module (SIM) dual standby (DSDS) mode, and wherein routing the data traffic packet to the second communication connection comprises: performing a default data subscription (DDS) switch to switch the DDS of the UE from the first subscription to the second subscription.

Aspect 27: The method of any of Aspects 1-26, wherein the UE is operating in a multiple subscriber identity module mode.

Aspect 28: The method of any of Aspects 1-27, wherein the UE is operating in a dual subscriber identity module dual active mode.

Aspect 29: The method of any of Aspects 1-26, wherein the UE is operating in a single subscriber identity module mode.

Aspect 30: The method of any of Aspects 1-29, wherein routing the data traffic packet to the second communication connection comprises: routing the data traffic packet to the second communication via a hardware component of the UE.

Aspect 31: A method of wireless communication performed by a user equipment (UE), comprising: establishing a first communication connection for a first subscription of the UE, wherein the first communication connection is associated with a first access point; establishing a second communication connection for a second subscription of the UE, wherein the second communication connection is associated with a second access point; transmitting a first identifier associated with the first access point and a second identifier associated with the second access point, wherein the first identifier indicates that the first access point is associated with the first subscription and the second identifier indicates that the second access point is associated with the second subscription; and receiving, from a device, a connection establishment request for establishing a tethering connection for the device using the first communication connection or the second communication connection based at least in part on the transmission of the first identifier and the second identifier.

Aspect 32: The method of Aspect 31, further comprising: establishing the tethering connection for the device using the first communication connection or the second communication connection based at least in part on the reception of the connection establishment request.

Aspect 33: The method of any of Aspects 31-32, wherein the first communication connection and the second communication connection are separate communication connections.

Aspect 34: The method of any of Aspects 31-33, wherein transmitting the first identifier associated with the first access point and the second identifier associated with the second access point comprises: transmitting a first service set identifier (SSID) of the first access point that indicates the first subscription; and transmitting a second SSID of the second access point that indicates the second subscription.

Aspect 35: The method of any of Aspects 31-34, wherein receiving the connection establishment request is based at least in part on traffic to be routed by the UE from the device being associated with a subscription of the first subscription or the second subscription.

Aspect 36: An apparatus for wireless communication at a device, comprising a processor; memory coupled with the processor; and instructions stored in the memory and executable by the processor to cause the apparatus to perform the method of one or more of Aspects 1-30 and/or 31-35.

Aspect 37: A device for wireless communication, comprising a memory and one or more processors coupled to the memory, the memory and the one or more processors configured to perform the method of one or more of Aspects 1-30 and/or 31-35.

Aspect 38: An apparatus for wireless communication, comprising at least one means for performing the method of one or more of Aspects 1-30 and/or 31-35.

Aspect 39: A non-transitory computer-readable medium storing code for wireless communication, the code comprising instructions executable by a processor to perform the method of one or more of Aspects 1-30 and/or 31-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-30 and/or 31-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

establishing a first communication connection associated with a first subscription of the UE or associated with a first network slice, wherein the first communication connection is a default connection for the UE for data traffic;

establishing a second communication connection associated with a second subscription of the UE or associated with a second network slice, wherein the second communication connection comprises a non-default connection for the UE for data traffic;

receiving, from a device tethered with the UE, via a wireless local area network provided by the UE or via a wired connection, a data traffic packet associated with one or more parameters;

routing the data traffic packet from the device to the second communication connection based at least in part on the one or more parameters and based at least in part on the second communication connection comprising the non-default connection; and transmitting the data traffic packet using the second communication connection.

2. The method of claim 1, further comprising:

determining whether the one or more parameters satisfy a rule indicated by a configuration of the UE; and determining whether to route the data traffic packet to the first communication connection or to the second communication connection based at least in part on the determination of whether the one or more parameters satisfy the rule indicated by the configuration.

3. The method of claim 1, wherein routing the data traffic packet to the second communication connection comprises:

performing a network address translation (NAT) for the data traffic packet to translate a local address associated with the device to a global address associated with the second subscription based at least in part on the one or more parameters satisfying a rule; and routing the data traffic packet to the second communication connection for the second subscription based at least in part on the performance of the NAT.

4. The method of claim 1, wherein receiving the data traffic packet comprises:

receiving the data traffic packet indicating a source address associated with the first subscription in a header of the data traffic packet; and wherein routing the data traffic packet to the second communication connection comprises:

performing a header translation for the header of the data traffic packet to modify the source address associated with the first subscription to a source address for routing the data traffic packet to the second subscription.

5. The method of claim 4, wherein performing the header translation for the header of the data traffic packet comprises:

modifying the header to indicate at least one of the source address associated with the second subscription or a source address that is based at least in part on a prefix of the source address associated with the second subscription.

6. The method of claim 1, wherein a configuration of the UE indicates one or more rules for identifying traffic that is to be routed to a non-default data subscription of the UE.

7. The method of claim 6,
wherein the one or more rules indicate at least one of:
    a service destination address of traffic to be routed to the non-default data subscription,
    a service fully qualified domain name (FQDN) of traffic to be routed to the non-default data subscription,
    a port number of traffic to be routed to the non-default data subscription, or
    a type of service value of traffic to be routed to the non-default data subscription.

8. The method of claim 1,
wherein a configuration of the UE indicates one or more rules that are specific to an identifier associated with the second subscription.

9. The method of claim 1,
wherein routing the data traffic packet to the second communication connection comprises:
    determining that the one or more parameters satisfy a rule indicated by a configuration; and
    routing the data traffic packet to the second network slice based at least in part on the determination that the one or more parameters satisfy the rule indicated by the configuration.

10. The method of claim 1, further comprising:
receiving an indication of one or more UE route selection policy (URSP) rules for identifying traffic that is to be routed to a non-default network slice; and
wherein routing the data traffic packet to the second communication connection comprises:
    determining that the one or more parameters satisfy at least one of a rule indicated by a configuration or a URSP rule of the one or more URSP rules.

11. The method of claim 1,
wherein routing the data traffic packet to the second communication connection comprises:
    routing the data traffic packet to the second subscription of the UE; and
    routing the data traffic packet to the second network slice, wherein the second network slice is a non-default network slice associated with the second subscription.

12. The method of claim 1, further comprising:
measuring a measurement parameter of the second communication connection; and
wherein routing the data traffic packet to the second communication connection comprises:
    determining that a value of the measurement parameter satisfies a threshold; and
    routing the data traffic packet to the second communication connection based at least in part on the determination that the value of the measurement parameter satisfies the threshold.

13. The method of claim 12,
wherein the measurement parameter comprises one of a reference signal received power (RSRP) parameter, a reference signal received quality (RSRQ) parameter, or a signal-to-noise ratio (SNR) parameter.

14. The method of claim 1,
wherein the one or more parameters indicate a throughput level associated with the data traffic packet, and wherein routing the data traffic packet to the second communication connection comprises:
    determining that the throughput level associated with the data traffic packet satisfies a throughput threshold; and
    routing the data traffic packet to the second communication connection based at least in part on the determination that the throughput level associated with the data traffic packet satisfies the throughput threshold.

15. A user equipment (UE) for wireless communication, comprising:
    one or more memories; and
    one or more processors, coupled to the one or more memories, configured to:
        establish a first communication connection associated with a first subscription of the UE or associated with a first network slice, wherein the first communication connection is a default connection for the UE for data traffic;
        establish a second communication connection associated with a second subscription of the UE or associated with a second network slice, wherein the second communication connection comprises a non-default connection for the UE for data traffic;
        receive, from a device tethered with the UE, via a wireless local area network provided by the UE or via a wired connection, a data traffic packet associated with one or more parameters;
        route the data traffic packet from the device to the second communication connection based at least in part on the one or more parameters and based at least in part on the second communication connection comprising the non-default connection; and
        transmit the data traffic packet using the second communication connection.

16. The UE of claim 15,
wherein the one or more processors are further configured to:
    determine whether the one or more parameters satisfy a rule indicated by a configuration of the UE; and
    determine whether to route the data traffic packet to the first communication connection or to the second communication connection based at least in part on the determination of whether the one or more parameters satisfy the rule indicated by the configuration.

17. The UE of claim 15,
wherein the one or more processors, to route the data traffic packet to the second communication connection, are configured to:
    perform a network address translation (NAT) for the data traffic packet to translate a local address associated with the device to a global address associated with the second subscription based at least in part on the one or more parameters satisfying a rule; and
    route the data traffic packet to the second communication connection for the second subscription based at least in part on the performance of the NAT.

18. The UE of claim 15,
wherein the one or more processors, to receive the data traffic packet, are configured to:
    receive the data traffic packet indicating a source address associated with the first subscription in a header of the data traffic packet; and
    wherein the one or more processors, to route the data traffic packet to the second communication connection, are configured to:
        perform a header translation for the header of the data traffic packet to modify the source address associated with the first subscription to a source address for routing the data traffic packet to the second subscription.

19. The UE of claim 18,
wherein the one or more processors, to perform the header translation for the header of the data traffic packet, are configured to:
   modify the header to indicate at least one of the source address associated with the second subscription or a source address that is based at least in part on a prefix of the source address associated with the second subscription.

20. The UE of claim 15,
wherein a configuration of the UE indicates one or more rules for identifying traffic that is to be routed to a non-default data subscription of the UE.

21. The UE of claim 20,
wherein the one or more rules indicate at least one of:
   a service destination address of traffic to be routed to the non-default data subscription,
   a service fully qualified domain name (FQDN) of traffic to be routed to the non-default data subscription,
   a port number of traffic to be routed to the non-default data subscription, or
   a type of service value of traffic to be routed to the non-default data subscription.

22. The UE of claim 15,
wherein a configuration of the UE indicates one or more rules that are specific to an identifier associated with the second subscription.

23. The UE of claim 15,
wherein the one or more processors, to route the data traffic packet to the second communication connection, are configured to:
   determine that the one or more parameters satisfy a rule indicated by a configuration; and
   route the data traffic packet to the second network slice based at least in part on the determination that the one or more parameters satisfy the rule indicated by the configuration.

24. The UE of claim 15,
wherein the one or more processors are further configured to:
   receive an indication of one or more UE route selection policy (URSP) rules for identifying traffic that is to be routed to a non-default network slice; and
   wherein the one or more processors, to route the data traffic packet to the second communication connection, are configured to:
      determine that the one or more parameters satisfy at least one of a rule indicated by a configuration or a URSP rule of the one or more URSP rules.

25. The UE of claim 15,
wherein the one or more processors, to route the data traffic packet to the second communication connection, are configured to:
   route the data traffic packet to the second subscription of the UE; and
   route the data traffic packet to the second network slice, wherein the second network slice is a non-default network slice associated with the second subscription.

26. The UE of claim 15,
wherein the one or more processors are further configured to:
   measure a measurement parameter of the second communication connection, and
      wherein the one or more processors, to route the data traffic packet to the second communication connection, are configured to:

determine that a value of the measurement parameter satisfies a threshold; and
   route the data traffic packet to the second communication connection based at least in part on the determination that the value of the measurement parameter satisfies the threshold.

27. The UE of claim 15,
wherein the one or more processors, to route the data traffic packet to the second communication connection, are configured to:
   route the data traffic packet to the second communication connection via a hardware component of the UE.

28. The UE of claim 15,
wherein the one or more parameters indicate a throughput level associated with the data traffic packet, and wherein the one or more processors, configured to route the data traffic packet to the second communication connection, are further configured to:
   determine that the throughput level associated with the data traffic packet satisfies a throughput threshold; and
   route the data traffic packet to the second communication connection based at least in part on the determination that the throughput level associated with the data traffic packet satisfies the throughput threshold.

29. A non-transitory computer-readable medium storing a set of instructions for wireless communication, the set of instructions comprising:
   one or more instructions that, when executed by one or more processors of a user equipment (UE), cause the UE to:
      establish a first communication connection associated with a first subscription of the UE or associated with a first network slice, wherein the first communication connection is a default connection for the UE for data traffic;
      establish a second communication connection associated with a second subscription of the UE or associated with a second network slice, wherein the second communication connection comprises a non-default connection for the UE for data traffic;
      receive, from a device tethered with the UE, via a wireless local area network provided by the UE or via a wired connection, a data traffic packet associated with one or more parameters;
      route the data traffic packet from the device to the second communication connection based at least in part on the one or more parameters and based at least in part on the second communication connection comprising the non-default connection; and
      transmit the data traffic packet using the second communication connection.

30. An apparatus for wireless communication, comprising:
   means for establishing a first communication connection associated with a first subscription of the apparatus or associated with a first network slice, wherein the first communication connection is a default connection for the apparatus for data traffic;
   means for establishing a second communication connection associated with a second subscription of the apparatus or associated with a second network slice, wherein the second communication connection comprises a non-default connection for the apparatus for data traffic;

means for receiving, from a device tethered with the apparatus, via a wireless local area network provided by the apparatus or via a wired connection, a data traffic packet associated with one or more parameters;

means for routing the data traffic packet from the device 5 to the second communication connection based at least in part on the one or more parameters and based at least in part on the second communication connection comprising the non-default connection; and means for transmitting the data traffic packet using the 10 second communication connection.

* * * * *